(12) United States Patent
Tao et al.

(10) Patent No.: US 9,807,407 B2
(45) Date of Patent: Oct. 31, 2017

(54) REFERENCE PICTURE SELECTION

(71) Applicant: QUALCOMM Incorporated, San Diego, CA (US)

(72) Inventors: Siping Tao, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 14/557,049

(22) Filed: Dec. 1, 2014

(65) Prior Publication Data

US 2015/0156487 A1 Jun. 4, 2015

Related U.S. Application Data

(60) Provisional application No. 61/910,766, filed on Dec. 2, 2013.

(51) Int. Cl.
*H04N 19/433* (2014.01)
*H04N 19/58* (2014.01)
*H04N 19/423* (2014.01)
*H04N 19/573* (2014.01)
*H04N 19/164* (2014.01)
(Continued)

(52) U.S. Cl.
CPC ......... *H04N 19/433* (2014.11); *H04N 19/105* (2014.11); *H04N 19/154* (2014.11); *H04N 19/164* (2014.11); *H04N 19/172* (2014.11); *H04N 19/423* (2014.11); *H04N 19/573* (2014.11); *H04N 19/577* (2014.11); *H04N 19/58* (2014.11); *H04N 19/152* (2014.11); *H04N 19/51* (2014.11)

(58) Field of Classification Search
None
See application file for complete search history.

(56) References Cited

U.S. PATENT DOCUMENTS

2006/0083298 A1* 4/2006 Wang ................... H04N 19/196
375/240.01
2010/0118933 A1* 5/2010 Pandit .................. H04N 19/597
375/240.01

(Continued)

FOREIGN PATENT DOCUMENTS

WO 2013126284 A2 8/2013

OTHER PUBLICATIONS

R. Sjöberg, Y. Chen, A. Fujibayashi, M.M. Hannuksela, J. Samuelsson, T.K. Tan, Y.K. Wang, & S. Wenger, "Overview of HEVC High-Level Syntax and Reference Picture Management", 22 IEEE Transactions on Circuits & Sys. for Video Tech. 1858-1870 (Dec. 2012).*

(Continued)

*Primary Examiner* — David N Werner

(57) ABSTRACT

Techniques are described where a device that includes a video decoder outputs information identifying a picture to a device that includes a video encoder. The video encoder may determine pictures that could have been used to inter-prediction encode the identified picture and/or pictures following the identified picture in coding order. The video encoder may inter-prediction encode a current picture based on one or more of the determined pictures and/or the identified picture.

14 Claims, 7 Drawing Sheets

(51) Int. Cl.
  *H04N 19/172* (2014.01)
  *H04N 19/577* (2014.01)
  *H04N 19/154* (2014.01)
  *H04N 19/105* (2014.01)
  *H04N 19/152* (2014.01)
  *H04N 19/51* (2014.01)

(56) References Cited

U.S. PATENT DOCUMENTS

| | | | |
|---|---|---|---|
| 2012/0230409 A1* | 9/2012 | Chen | H04N 19/105 375/240.15 |
| 2014/0050270 A1* | 2/2014 | Lim | H04N 19/31 375/240.25 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Mulroy, et al., "Windowed Reference Picture Selection for H.264 Transmission Error Recovery", Picture Coding Symposium; Nov. 7-9, 2007; Lisbon, Nov. 7, 2007, XP030080494, 4 pp.

Wang, et al., "AHG15: On reference picture set derivation and LTRP signaling in Slice header," JCT-VC Meeting; MPEG Meeting; Apr. 27-May 7, 2012; Geneva; ((Joint Collaborative Team on Video Coding of ISO/IEC JTCl/ SC29/WG11 and ITU-T SG.16); URL: http://wftp3.itu.int/av-arch/ jctvc-site/, No. JCTVC-I0342, Apr. 17, 2012, XP030112105, 6 pp.

Wang, et al., "Error resilient video coding using flexible reference frames", Visual Communications and Image Processing, Jul. 12-15, 2005; Beijing, Jul. 12, 2005, XP030080909, 12 pp.

Wang, et al., "RTP Payload Format for High Efficiency Video Coding," Network Working Group, Sep. 6, 2013, 76 pp.

Bross, et al., "Editors' Proposed Corrections to HEVC Version 1," Apr. 18-26, 2013; Joint Collaborative Team on Video Coding (JCT-VC) of ITU-T SG16 WP3 and ISO/IEC JTC1/SC29/WG11, 13th Meeting, Incheon, KR, Document: JCTVC-M0432_v3; Sep. 30, 2013, XP030057924, 309 pp.

International Search Report and Written Opinion from International Application No. PCT/US2014/068031, dated Mar. 13, 2015, 13 pp.

Response to Written Opinion dated Mar. 13, 2015, from International Application No. PCT/US2014/068031, filed on Oct. 1, 2015, 7 pp.

Second Written Opinion from International Application No. PCT/US2014/068031, filed on Nov. 2, 2015, 7 pp.

Response to Second Written Opinion dated Nov. 2, 2015, from International Application No. PCT/US2014/068031, filed on Dec. 30, 2015, 19 pp.

International Preliminary Report on Patentability from International Application No. PCT/US2014/068031, dated Mar. 10, 2016, 9 pp.

\* cited by examiner

REFERENCE PICTURE SELECTION

This application claims the benefit of U.S. Provisional Patent Application No. 61/910,766, filed Dec. 2, 2013, the entire content of which is incorporated herein by reference.

TECHNICAL FIELD

This disclosure relates to video coding (i.e., video encoding or video decoding).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes example techniques for determining pictures from which one or more reference pictures are selected for encoding and decoding a current picture based on information output by a video decoder. For instance, a video decoder may output information identifying a previously decoded picture stored in a buffer of the video decoder to a video encoder. The video encoder receives the output information from the video decoder and may determine pictures that are available for coding based on: the identified picture, pictures that were determined to be pictures that could have been reference pictures for the identified picture, and/or pictures following the identified picture in coding order. The video encoder may then utilize one or more of the pictures determined to be available for coding to inter-predict a current picture.

For instance, not all pictures that were determined to be pictures that could have been reference pictures for the identified picture and pictures following the identified picture in coding order may be available for coding. However, there is a relatively high certainty that if pictures, which were determined to be pictures that could have been reference pictures for the identified picture and pictures following the identified picture in coding order, are still available for encoding a current picture by the video encoder, then those pictures will also be available for decoding the current picture by the video decoder. In this manner, the video encoder may be able to select from a plurality of pictures, rather than only the identified picture, for encoding a current picture with relatively high certainty that the selected picture(s) will be available at the video decoder for decoding the current picture.

In one example, the disclosure describes a method of encoding video data, the method comprising receiving, from a device comprising a video decoder, information identifying a previously decoded picture that is stored in a decoded picture buffer (DPB) of the video decoder at the time the video decoder transmitted the information, determining one or more candidate reference pictures that are available for encoding a current picture based on the identified picture, wherein the one or more candidate reference pictures include one or more pictures that were previously determined to be usable for inter-prediction encoding one or more of the identified picture or pictures following the identified picture in coding order, and that are still stored in a DPB of a video encoder, selecting one or more reference pictures for the current picture from the determined one or more candidate reference pictures and the identified picture, and inter-prediction encoding the current picture based on the selected one or more reference pictures.

In one example, the disclosure describes a method of decoding video data, the method comprising outputting, to a device comprising a video encoder, information identifying a previously decoded picture stored in a decoded picture buffer (DPB) of a video decoder at the time of outputting the information, and inter-prediction decoding a current picture with one or more candidate reference pictures, wherein the one or more candidate reference pictures include one or more pictures that were previously determined, by the video encoder, to be usable for inter-prediction encoding the identified picture.

In one example, the disclosure describes a device for encoding video data, the device comprising a first decoded picture buffer (DPB) comprising a memory configured to store one or more pictures, and a video encoder comprising one or more processors. The video encoder is configured to receive, from a device comprising a video decoder, information identifying a previously decoded picture that is stored in a second DPB of the video decoder at the time the video decoder transmitted the information, determine one or more candidate reference pictures that are available for encoding a current picture based on the identified picture, wherein the one or more candidate reference pictures include one or more pictures that were previously determined to be usable for inter-prediction encoding one or more of the identified picture or pictures following the identified picture in coding order, and that are still stored in the first DPB, select one or more reference pictures for the current picture from the determined one or more candidate reference pictures and the identified picture, and inter-prediction encode the current picture based on the selected one or more reference pictures.

In one example, the disclosure describes a device for decoding video data, the device comprising a decoded picture buffer (DPB) comprising a memory configured to store one or more pictures, and a video decoder comprising one or more processors. The video decoder is configured to output, to a device comprising a video encoder, information identifying a previously decoded picture stored in the DPB of the video decoder at the time of outputting the information, and inter-prediction decode a current picture with one or more candidate reference pictures, wherein the one or more candidate reference pictures include one or more pictures that were previously determined, by the video encoder, to be usable for inter-prediction encoding the identified picture.

The details of one or more examples of the disclosure are set forth in the accompanying drawings and the description below. Other features, objects, and advantages will be apparent from the description, drawings, and claims.

DETAILED DESCRIPTION

Figure 1:
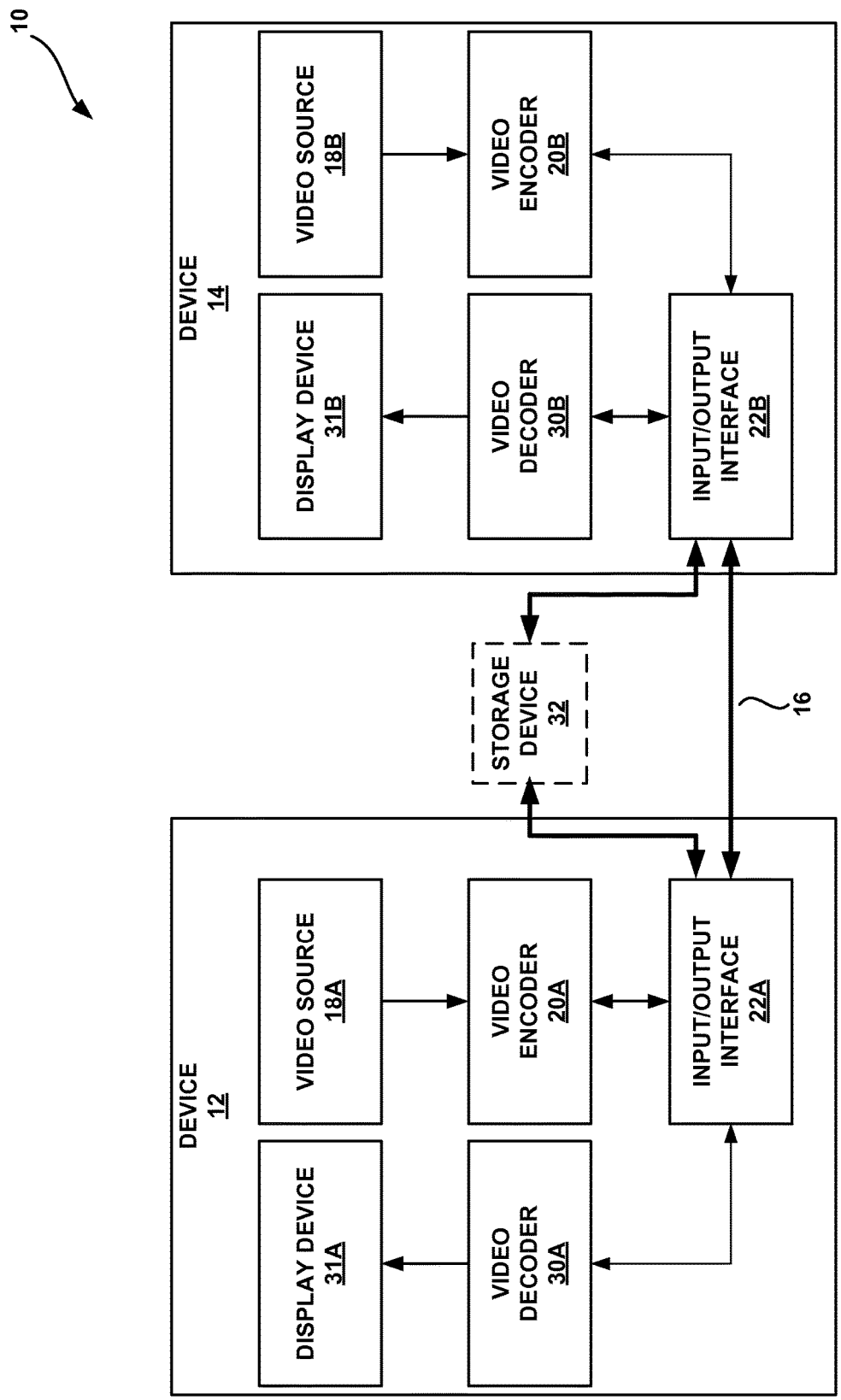
FIG. 1 is a block diagram illustrating an example video encoding and decoding system that may utilize the techniques described in this disclosure.

The techniques described in this disclosure are generally related to video coding, including examples of real-time video applications. For instance, the techniques described in this disclosure may be applicable to video telephony or video conferencing, where video is being encoded and decoded, in real-time, on each side of the video telephony or conference. As another example, the techniques described in this disclosure may be applicable to live streaming, where the video of the live event is being encoded in real-time for broadcast. However, the techniques described in this disclosure should not be considered limited to video telephony, video conferencing, or real-time video encoding of a live event. The techniques described in this disclosure may be applicable to video coding where a video decoder is capable of transmitting information to a video encoder that is encoding the video data being transmitted to the video decoder.

In real-time video coding, a video decoder may be configured to communicate with a video encoder (e.g., using a real-time transport protocol (RTP)) to have the video encoder determine pictures that are available for coding from which the video encoder selects one or more reference pictures for inter-prediction encoding a current picture. There may be various reasons for why the video decoder may communicate with the video encoder to determine such pictures that are available for coding, and the techniques described in this disclosure are not limited any particular reason for why the video decoder may communicate with the video encoder to determine such pictures that are available for coding.

In some examples, the video decoder may communicate with the video encoder to have the video encoder determine candidate reference pictures (i.e., pictures that available for coding) so that the video encoder selects reference pictures for inter-prediction encoding a current picture for which there is a relatively high level of certainty that these reference pictures will be available in a buffer (e.g., decoded picture buffer (DPB)) of the video decoder. As an example for illustration purposes only, the video decoder may communicate with the video encoder to have the video encoder determine candidate reference pictures for purposes of limiting error propagation.

In some cases, a video decoder may not receive some or all of the video data needed to reconstruct a picture. A picture that the video decoder is unable to reconstruct is referred to as a missed picture. In addition to the video decoder not being able to output the missed picture, if the missed picture is used as a reference picture for a subsequent picture, decoding errors propagate because the video decoder may not be able to reconstruct this subsequent picture.

To limit propagation errors, the video decoder may output information to the video encoder that the video encoder uses to select reference pictures, for inter-predicting a current picture, for which there is a relatively high probability that the reference pictures are stored in the DPB of the video decoder. In some cases, it may be virtually guaranteed that the selected pictures are in the DPB of the video decoder. In this way, by using pictures with a relatively high probability of existing in the DPB of the video decoder, the video encoder may not use the missed picture as a reference picture, and the video decoder would be able to reconstruct the current picture without error.

It should be understood that limiting error propagation is described for purposes of illustration, and the communication of information from the video decoder to the video encoder may also be performed for other reasons. The video decoder may output information that the video encoder uses to select reference pictures for reasons in addition to or separate from limiting error propagation. For example, the video decoder may output information that the video encoder uses to select reference pictures in examples where there was not a missed picture.

In the techniques described in this disclosure, the video decoder may transmit information, to the video encoder, wherein the information identifies a previously decoded picture that is currently stored in the DPB of the video decoder at the instance (e.g., when) the video decoder transmits the information to the video encoder. The identified picture may correspond to one possible candidate reference picture (i.e., the identified picture may be one of the pictures available for coding). However, in accordance with the techniques described in this disclosure, in addition to the identified picture, one or more pictures that the video encoder had determined as possible reference pictures for the identified picture are also additional candidate reference pictures (i.e., one or more picture that the video encoder had determined as possible reference pictures for the identified picture are pictures that are available for coding, and in some examples, also including possible reference pictures of the reference pictures of the identified picture). It should be noted that one or more of the possible reference pictures for the identified picture may have been actual reference pictures for the identified picture. In other words, "possible reference pictures for the identified picture" should not be interpreted to exclude reference pictures that were actually used to inter-predict the identified picture.

In some examples, in encoding a picture, the video encoder may determine pictures that could have been used to inter-prediction encode the picture (including pictures that are actually used to inter-prediction encode the picture). The video encoder may store information indicating the pictures that could have been used to inter-prediction encode respective pictures and following pictures. In response to receiving information identifying a particular picture from the video decoder, the video encoder may retrieve the stored information indicating the pictures that could have been used to inter-prediction encode the identified picture and following pictures. The video encoder may determine which pictures indicated in the retrieved information are still stored in a buffer of the video encoder, and may then select one or more reference pictures from the determined pictures to inter-prediction encode a current picture.

For example, the High Efficiency Video Coding (HEVC) standard defines a plurality of reference picture subsets that the video encoder and the video decoder construct for each picture. For a particular picture, three of the reference picture subsets indicate reference pictures that can potentially be used to inter-predict the particular picture and pictures following the particular picture in decoding order. Two of the reference picture subsets indicate reference pictures that cannot be used to inter-predict the particular picture, but can potentially be used to inter-predict the pictures following the particular picture in decoding order. The term "reference picture set" refers to the combination of the plurality of reference picture subsets.

A video encoder and a video decoder configured in accordance with the HEVC standard may exploit the reference picture subsets defined in the HEVC standard to implement the example techniques described in this disclosure. However, for a video encoder and a video decoder configured in accordance with the H.264/AVC standard, or otherwise, may not have predefined reference picture subsets. For such video encoders and video decoders, the video encoder may be configured to maintain a list of possible reference pictures that the video encoder could have used for inter-predicting pictures.

To ease with understanding, the term "picture set" of a particular picture, as used in this disclosure, refers to pictures that could have been used to inter-predict the particular picture and pictures following the identified picture in coding order. As one example, in the context of HEVC, the term "picture set" of a particular picture refers to pictures, but not necessarily all pictures, in a reference picture set of the particular picture. As another example, in the context of H.264/AVC or otherwise, the term "picture set" of a particular picture refers to pictures indicated in a maintained list of pictures that the video encoder could have used for inter-predicting the particular picture.

In the techniques described in this disclosure, in response to receiving information identifying a picture stored in the DPB of the video decoder, the video encoder may determine which pictures in the picture set of the identified picture are still available in the DPB of the video encoder (i.e., currently stored in the DPB of the video encoder), and in some examples, the video encoder may also determine which pictures in the picture set of pictures in the picture set of the identified picture are still available in the DPB of the video encoder. Pictures considered to be pictures that are available for coding a current picture (i.e., candidate reference pictures for a current picture) may include: pictures that are determined to be in the picture set of the identified picture, pictures in the picture set of the pictures in the picture set of the identified picture that are still available in the DPB of the video encoder, and the identified picture itself. The video encoder may select one or more reference pictures from the pictures that are available for coding the current picture, and inter-predict the current picture from the selected reference picture(s).

In general, there may be a very high certainty (e.g., virtually guaranteed) that a picture that is stored in the DPB of the video encoder, which could have been a reference picture for the identified picture and pictures following the identified picture in coding order, at the time the video encoder encodes the current picture is also stored in the DPB of the video decoder at the time the video decoder decodes the current picture. This very high certainty may be due to the fact that the video decoder may remove a picture from its DPB after the video encoder removes the picture from its DPB. In other words, if there is a picture in the DPB that could have been used to inter-predict the identified picture and pictures following the identified picture in coding order, and the video encoder has not yet removed that picture from its DPB, then there is a very high likelihood that video decoder has not removed that picture from its DPB. Therefore, although not all of the pictures in the DPB of the video encoder need to be in the DPB of the video decoder, and vice-versa, if there is a picture in the DPB of the video encoder that could have been used to inter-predict the identified picture and pictures following the identified picture in coding order, which the video decoder identified as a picture stored in its DPB, then that picture is virtually guaranteed to be in the DPB of the video decoder.

In the techniques described in this disclosure, the video encoder may be capable of determining a plurality of pictures, which are known to be available for decoding by the video decoder, that can be used for inter-predicting a current picture. For instance, it may be possible for the video decoder to transmit information identifying a plurality of pictures in its DPB, and having the video encoder then select one or more of these identified pictures as reference pictures for the current picture. However, having the video decoder transmit information identifying a plurality of pictures in its DPB may be bandwidth intensive. However, having the video decoder identify only one picture, and having the video encoder use that one picture for inter-predicting the current picture may result in poor coding efficiency, which in turn results in higher bandwidth usage.

The techniques described in this disclosure can allow for the video decoder to identify only a few pictures (e.g., one or more pictures) in its DPB, and enable the video encoder to determine additional pictures (e.g., a plurality of pictures) based on the identified picture(s) (e.g., pictures in the reference picture set of the identified picture(s) that are still available in the DPB of the video encoder) that can all be used to inter-predict a current picture. In this manner, the techniques described in this disclosure require lower bandwidth usage (e.g., the video decoder may output information identifying one picture), but provide higher coding efficiency because the video encoder can select from a plurality of pictures the pictures that will provide best coding efficiency for inter-predicting the current picture.

For example, a video encoder may receive, from a device that includes a video decoder, information identifying a previously decoded picture that is stored in a DPB of the video decoder at the time the video decoder transmitted the information (e.g., when the video decoder transmit information identifying a picture, that picture is stored in the DPB of the video decoder). The video encoder may determine one or more candidate reference pictures that are available for encoding a current picture based on the identified picture. The one or more candidate reference pictures include one or more pictures that were previously determined to be usable for inter-prediction encoding one or more of the identified picture or pictures following the identified picture in coding order, and that are still stored in a DPB of the video encoder. The video encoder may select one or more reference pictures for the current picture from the determined one or more candidate reference pictures and the identified picture. The video encoder may then inter-prediction encode the current picture based on the selected one or more reference pictures.

A video decoder, in the example techniques described in this disclosure, may output, to a device that includes a video encoder, information identifying a previously decoded picture stored in its DPB at the time of outputting the information. The video decoder may inter-prediction decode a current picture with one or more candidate reference pictures. The one or more candidate reference pictures include one or more pictures that were previously determined, by the video encoder, to be usable for inter-prediction encoding the identified picture.

FIG. 1 is a block diagram illustrating an example video encoding and decoding system 10 that may utilize the techniques described in this disclosure. As shown in FIG. 1, system 10 includes a device 12 and a device 14. In some examples, device 12 and device 14 may be devices used for video telephony or video conferencing in which video is encoded and decoded in "real-time" (e.g., as captured, encoded, and transmitted and received, decoded, and displayed with very little delay). For ease of description, the techniques are described with respect to video telephony or video conferring, but the techniques are not so limited. In some examples, the techniques may be usable for live-streaming. The techniques described in this disclosure need not be limited to real-time applications.

Device 12 and device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, device 12 and device 14 may be equipped for wireless communication.

For real time video, device 12 may transmit video that device 14 decodes, and device 14 may transmit video that device 12 decodes. In this sense, in some cases, device 12 may function as both a source device and as a destination device, and device 14 may function as both a destination device and a source device.

For instance, device 12 is illustrated as including components such as video encoder 20A for transmitting video and device 14 is illustrated as including components such as video decoder 30B for receiving video data. However, since device 12 may also need to receive video, device 12 may also include video decoder 30A. Also, since device 14 may also need to transmit video, device 14 may also include video encoder 20B.

For ease of description, the techniques are described with respect to device 12 transmitting video that device 14 receives. However, it should be understood that device 14 also transmits video, in some examples, and may be configured, in general, to transmit data to device 12.

For example, in some examples, device 12 and device 14 may be in communication with one another, where both devices are configured to transmit data to and receive data from one another. In real time video application, device 14 may need to transmit data (e.g., its own encoded video or some other data such as information that device 12 uses for encoding video that device 14 receives). Therefore, as illustrated in FIG. 1, device 14 may include components to transmit data to device 12 (e.g., video source 18B, video encoder 20B, and input/output interface 22B that transmit encoded video from video encoder 20B to device 12). Similarly, as illustrated in FIG. 1, device 12 may include components to receive data from device 14 (e.g., input/output interface 22A, video decoder 30A, display device 31A).

In other words, device 12 and device 14 may include substantially similar components to allow for two-way communication. For instance, video source 18A and video source 18B may capture respective videos. Video encoder 20A encodes the video from video source 18A, and video encoder 20B encodes the video from video source 18B. Input/output interface 22A transmits the video data from video encoder 20A via link 16 to input/output interface 22B, and input/output interface 22B transmits the video data from video encoder 20B via link 16 to input/output interface 22A. Input/output interface 22B may transmit the video to video decoder 30B for video decoding, and then to display device 31B, from video decoder 30B, for display. Input/output interface 22A may transmit the video to video decoder 30A for video decoding, and then to display device 31A, from video decoder 30A, for display.

Although the above examples of real-time video application are described in context of video telephony or video conferencing where device 12 and device 14 transmit and receive video, the techniques described in this disclosure are not so limited. In some examples, device 12 may transmit video data of a live event to device 14. In this example, device 12 may not need to receive video from device 14 (and not need to include video decoder 30A or display device 31A); however, the techniques described in this disclosure are applicable to such examples of real-time video application.

Device 12 and device 14 may transmit and receive encoded video data to be decoded via a link 16. Link 16 may comprise any type of medium or device capable of moving the encoded video data between device 12 and device 14. In one example, link 16 may comprise a communication medium to enable device 12 and device 14 to transmit encoded video data directly to one another in real-time. The encoded video data may be modulated according to a communication standard, such as a wireless communication protocol, and transmitted. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from device 12 to device 14. In this way, link 16 functions as a medium by which device 12 and device 14 perform two-way communication.

In some examples described herein, a video bitstream may be communicated over a two way protocol. For example, example protocols may be Internet Protocol (IP) based such as the Real-time Transport Protocol (RTP). In particular, some examples include additional protocol messages for RTP and similar protocols to improve streaming communication as discussed herein. RTP is generally used for video telephony and video conferencing, as well as for streaming live content.

For example, in FIG. 1, video decoder 30A, video encoder 20A, video decoder 30B, and video encoder 20B are illustrated with double arrows to respective input/output interface 22A and 22B. In some examples, in addition to receiving video data, video decoder 30A may transmit information that is used by video encoder 20B for video encoding, and, in addition to receiving video data, video decoder 30B may transmit information that is used by video encoder 20A for video encoding. Such transmission of information from video decoder 30A to video encoder 20B and from video decoder 30B to video encoder 20A may be in accordance with the RTP (e.g., additional protocol messages for RTP) or may similar protocols to allow for real-time transmission of information from a video decoder to a video encoder.

Alternatively, encoded data may be output from input/output interface 22A to a storage device 32 for access by input/output interface 22B. Similarly, encoded data may be output from input/output interface 22B to storage device 32 for access by input/output interface 22A. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by device 12 or device 14 for later access by the other. The file server may be any type of server capable of storing encoded video data and transmitting that encoded video data. Example file servers include a web server (e.g., for a website), an FTP server, network attached storage (NAS) devices, or a local disk drive. Device 12 and device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In some cases, input/output interface 22A and 22B may each include a modulator/demodulator (modem) and/or a transmitter. In device 12 and device 14, video source 18A and 18B, respectively, may include a source such as a video capture device (e.g., a video camera), a video archive containing previously captured video, a video feed interface to receive video from a video content provider, and/or a computer graphics system for generating computer graphics data as the source video, or a combination of such sources. As one example, if video source 18A and 18B are video cameras, device 12 and device 14 may form so-called camera phones or video phones. However, the techniques described in this disclosure may be applicable to video coding in general, and may be applied to wireless and/or wired applications.

The captured, pre-captured, or computer-generated video may be encoded by respective ones of video encoder 20A and 20B. The encoded video data may be transmitted directly from device 12 to device 14, and vice-versa, via respective input/output interface 22A and 22B. The encoded video data may also (or alternatively) be stored onto storage device 32 for later access for decoding and/or playback.

The encoded video data communicated over link 16, or provided on storage device 32, may include a variety of syntax elements generated by video encoder 20A for use by video decoder 30B in decoding the video data, and may include a variety of syntax elements generated by video encoder 20B for use by video decoder 30A in decoding the video data. Such syntax elements may be included with the encoded video data transmitted on a communication medium, stored on a storage medium, or stored a file server.

Display device 31A and 31B may be with a component of device 12 or device 14 or may be a separate component that is external to device 12 or device 14. In some examples, device 12 and device 14 may include a display device component, and may also be configured to interface with another external display device. In other examples, device 12 and device 14 may themselves be display devices. In general, display device 31A and 31B display the decoded video data to a user, and may comprise any of a variety of display devices such as a liquid crystal display (LCD), a plasma display, an organic light emitting diode (OLED) display, or another type of display device.

Video encoder 20A and 20B (collectively "video encoders 20") and video decoder 30A and 30B (collectively "video decoders 30") may operate according to a video compression standard, such as the High Efficiency Video Coding (HEVC) standard, and may conform to the HEVC Test Model (HM). Furthermore, video encoders 20 and video decoders 30 may operate according extensions of the HEVC standard (referred to as HEVC Range Extension standard) presently under development. Video encoders 20 and video decoders 30 may also operate according to other proprietary or industry standards, such as the ITU-T H.264 standard, alternatively referred to as MPEG-4, Part 10, Advanced Video Coding (AVC) (i.e., H.264/AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoders 20 and video decoders 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoders 20 and video decoders 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoders 20 and video decoders 30 may be included in one or more encoders or decoders, either of which may be integrated as part of a combined encoder/decoder (CODEC) in a respective device. In some examples, when this disclosure describes video encoders 20 and video decoders 30 being part of a device, the device may be an integrated circuit (IC) or a microprocessor (e.g., video encoder 20A and video decoder 30A may be integrated together and possibly with other components in an integrated circuit or microprocessor, and video encoder 20B and video decoder 30B may be integrated together and possibly with other components in an integrated circuit or microprocessor). In some examples, the device may be a wireless device, such as a wireless communication device like device 12 or device 14.

The following is a brief description of the HEVC standard to assist with understanding. However, the techniques described in this disclosure are not limited to the HEVC standard, and are applicable to other standards such as H.264/AVC, or applicable to non-standards based video coding. For ease of description, the following is described with respect to video encoder 20A and video decoder 30B. However, video encoder 20B and video decoder 30A may be configured similar to video encoder 20A and video decoder 30B, respectively. In some examples, it may be possible for video encoder 20A and video encoder 20B to be configured differently. For example, video decoder 30A and video decoder 30B may be configured differently, but video encoder 20A may generate video data that is decodable by video decoder 30B and video encoder 20B may generate video data that is decodable by video decoder 30A. In other words, video encoder 20A and video encoder 20B may be configured similarly, and video decoder 30A and video decoder 30B may be configured similarly. However, this is not a requirement, and video encoder 20A and video encoder 20B may be configured differently, and video decoder 30A and video decoder 30B may be configured differently.

The JCT-VC has developed the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which is downloadable from: http://phenix.int-evry.fr/jct/doc_end_user/documents/12_Geneva/wg11/JCTVC-L1003-v34.zip.

Another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which is available from: http://phenix.int-evry.fr/jct/doc_end_user/documents/13_Incheon/wg11/JCTVC-M0432-v3.zip.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 (RefPicList0), List 1 (RefPicList1), or List C) for the motion vector.

In general, a TU is used for the transform and quantization processes. A given CU having one or more PUs may also include one or more TUs. Following prediction, video encoder 20A may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20A typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20A may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20A may form the TUs including the residual data for the CU, and then transform the TUs to produce transform coefficients for the CU.

Following any transforms to produce transform coefficients, video encoder 20A may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20A may utilize a predefined scan order to scan the quantized transform coefficients to produce a serialized vector that can be entropy encoded. In other examples, video encoder 20A may perform an adaptive scan. After scanning the quantized transform coefficients to form a one-dimensional vector, video encoder 20A may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20A may also entropy encode syntax elements associated with the encoded video data for use by video decoder 30B in decoding the video data.

To perform CABAC, video encoder 20A may assign a context within a context model to a symbol to be transmitted. The context may relate to, for example, whether neighboring values of the symbol are non-zero or not. To perform CAVLC, video encoder 20A may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
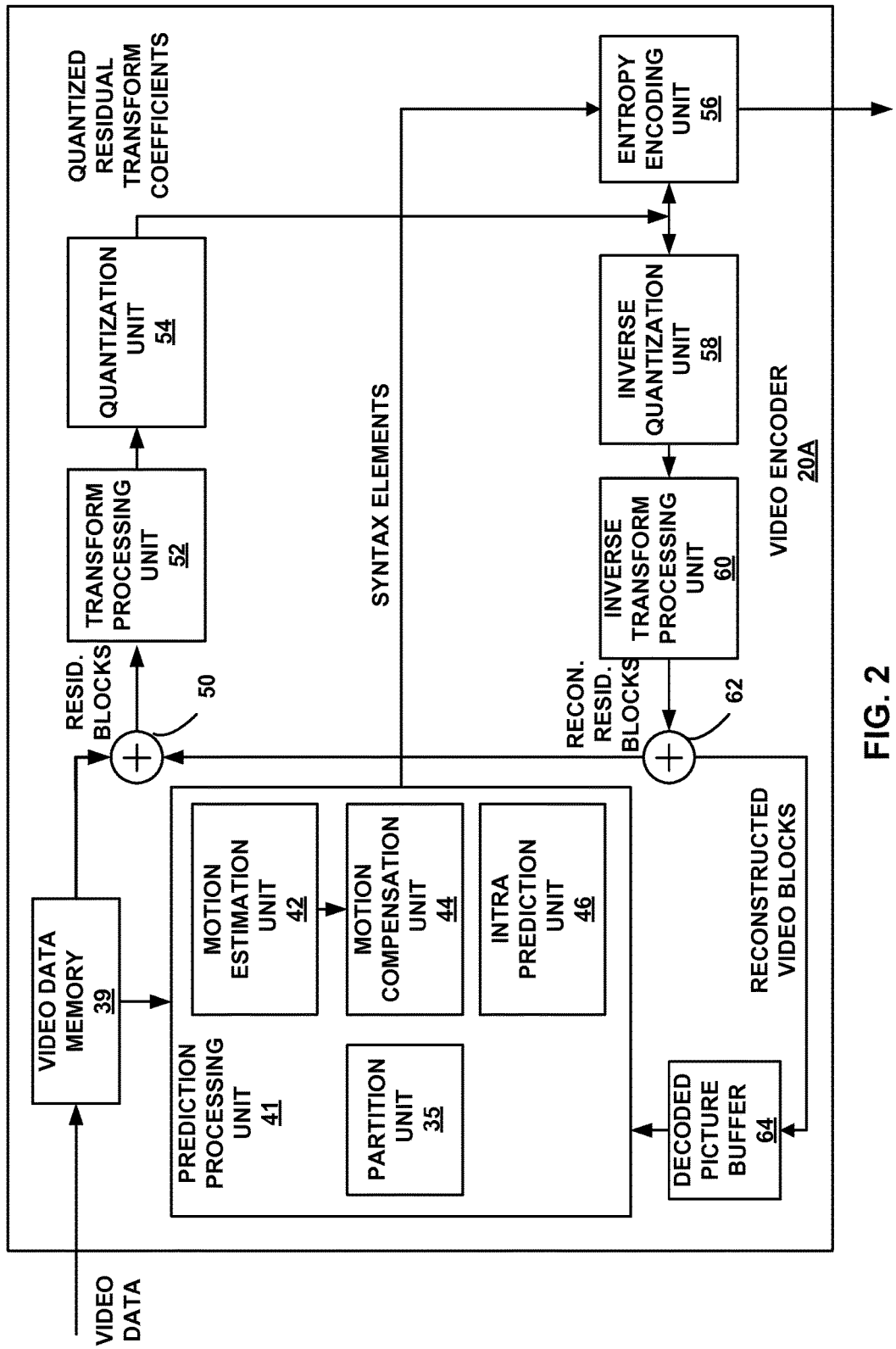
FIG. 2 is a block diagram illustrating an example video encoder that may implement the techniques described in this disclosure.

FIG. 2 is a block diagram illustrating an example video encoder 20A that may implement the techniques described in this disclosure. As described above, video encoder 20B may be similar to video encoder 20A; however, the techniques described in this disclosure are not so limited. Video encoder 20A may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20A includes video data memory 39, a partitioning unit 35, prediction processing unit 41, decoded picture buffer (DPB) 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20A also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video data memory 39 receives video data that is used for encoding a current video block within a video picture. Video data memory 39 may store video data to be encoded by the components of video encoder 20A (e.g., configured to store video data) or store video data that is to be used for encoding video pictures. For example, video data memory 39 may store parameter sets for each picture that video encoder 20A encodes (e.g., store information indicating pictures that could have been used to inter-predict respective pictures). In accordance with the techniques described in this disclosure, video data memory 39 may also store information, received from video decoder 30B, identifying a picture previously decoded by video decoder 30B. For example, video encoder 20A may be configured to inter-predict a current picture based on one or more of a picture identified by video decoder 30B, pictures that could have been used to inter-predict the picture identified by video decoder 30B, or pictures that could be used to inter-predict the pictures that could have been used to inter-predict the picture identified by video decoder 30B. In general, if video encoder 20A selects pictures from such a group of determined pictures, there is a high chance that the selected pictures are available for decoding by video decoder 30B.

In some examples, the video data stored in video data memory 39 may be obtained, for example, from video source 18A. DPB 64 stores reference video data for use in encoding video data by video encoder 20A (e.g., in intra-coding modes or inter-coding modes). Video data memory 39 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 39 and DPB 64 may be provided by the same memory device or separate memory devices. In various examples, video data memory 39 may be on-chip with other components of video encoder 20A, or off-chip relative to those components.

As shown in FIG. 2, video encoder 20A receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20A generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion).

Prediction processing unit 41 may be configured to implement the techniques of this disclosure for performing inter-prediction based on reference picture identified by video decoder 30B. Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20A may calculate values for sub-integer pixel positions of reference pictures stored in DPB 64. For example, video encoder 20A may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (RefPicList0) or a second reference picture list (RefPicList1), each of which identify one or more reference pictures stored in DPB 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20A forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30B in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or prediction processing unit 41, in some examples) may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20A may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20A forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30B, or archived for later transmission or retrieval by video decoder 30B. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in DPB 64. The reference block may be used by motion estimation unit 42 and motion compensation unit 44 as a reference block to inter-predict a block in a subsequent video frame or picture.

As described in more detail below, video encoder 20A may be configured to receive information, from video decoder 30B, indicative of reference pictures available for decoding at video decoder 30B. Video encoder 20A may inter-prediction encode a current picture based on one or more of the reference pictures available for decoding at video decoder 30B. In some examples, video encoder 20A may receive information indicative of reference pictures available for decoding at video decoder 30B if an error occurred in reconstruction of a reference picture by video decoder 30B. In some examples, to receive information indicative of reference pictures available for decoding at video decoder 30B, video encoder 20A may receive information identifying a picture identified in a reference picture set. Video encoder 20A may be configured to determine reference pictures included in the reference picture set as the reference pictures available for decoding at video decoder 30B.

In this manner, video encoder 20A may be configured to receive, from device 14 that includes video decoder 30B, information identifying a previously decoded picture that is stored in DPB 92 (FIG. 3) of video decoder 30B at the time video decoder 30B transmitted the information. Video encoder 20A may determine one or more candidate reference pictures that are available for encoding a current picture based on the identified picture. The one or more candidate reference pictures include one or more pictures that were previously determined to be usable for inter-prediction encoding one or more of the identified picture or pictures following the identified picture in coding order (e.g., based on the parameter set for the identified picture including the one or more of the reference picture subsets that form a reference picture set), and that are still stored in DPB 64 of video encoder 20A. Video encoder 20A (e.g., via prediction processing unit 41) may select one or more reference pictures for the current picture from the determined one or more candidate reference pictures and the identified picture.

Video encoder 20A may inter-prediction encode the current picture based on the selected one or more reference pictures. For example, video encoder 20A may select one picture from the determined candidate reference pictures and identified picture, and uni-directional predict for inter-predict the current picture. In some examples, video encoder 20A may select two pictures for the current picture from the determined candidate reference pictures and the identified picture, and bi-prediction encode the current picture (e.g., use two reference pictures, one from each reference picture list, to inter-prediction encode the current picture).

In some cases, video encoder 20A may determine whether the identified picture is available for encoding the current picture (e.g., stored in DPB 64). Video encoder 20A may intra-prediction encode, rather than inter-prediction encode, the current picture based on a determination that the identified picture is not available for encoding the current picture.

Video encoder 20A may also additionally receive information identifying a missed picture. Video encoder 20A may exclude the missed picture from the determined one or more candidate reference pictures.

Figure 3:
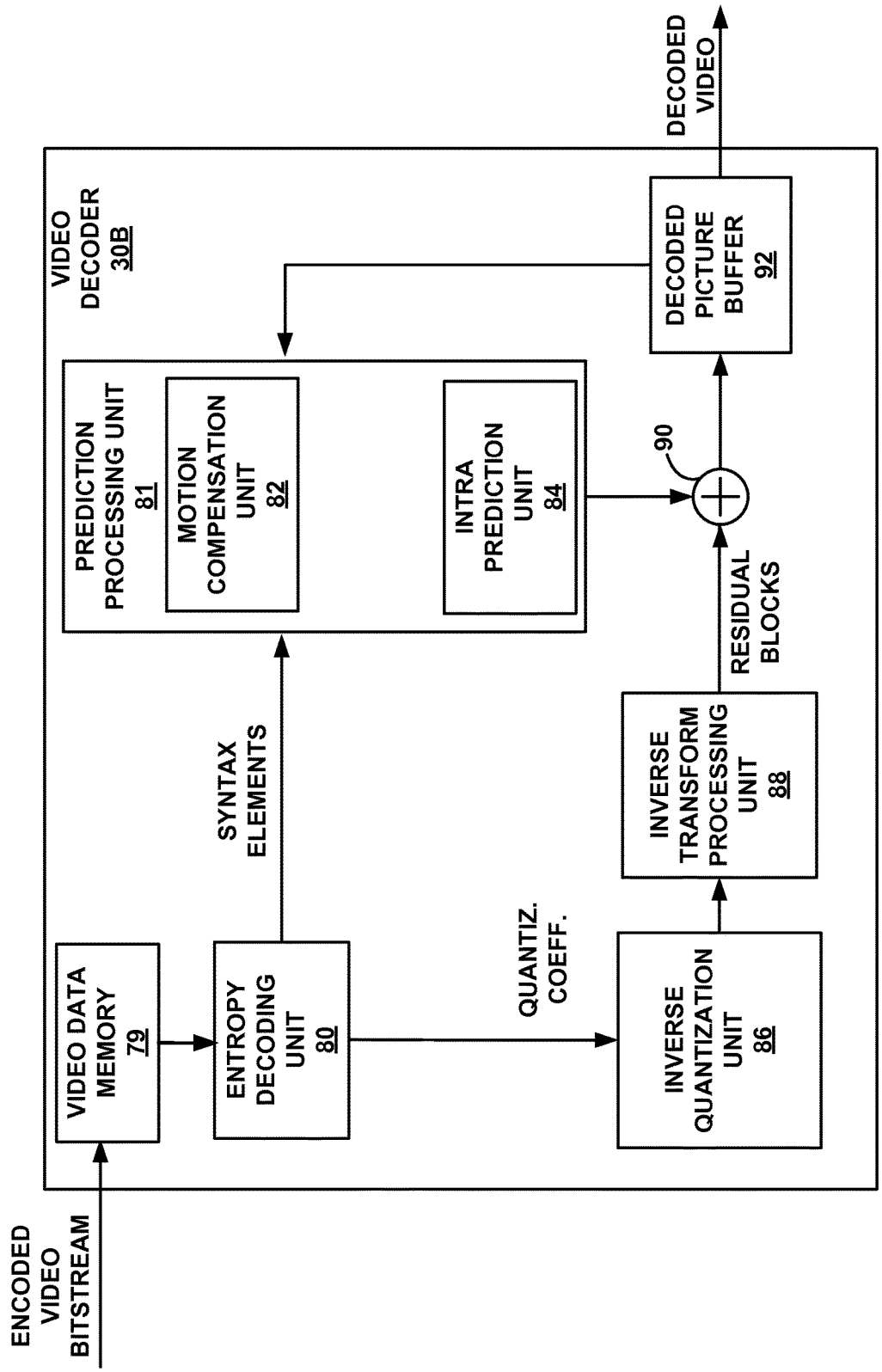
FIG. 3 is a block diagram illustrating an example video decoder that may implement the techniques described in this disclosure.

FIG. 3 is a block diagram illustrating an example video decoder 30B that may implement the techniques described in this disclosure. As described above, video decoder 30A may be similar to video decoder 30B; however, the techniques described in this disclosure are not so limited. In the example of FIG. 3, video decoder 30B includes an entropy decoding unit 80, prediction processing unit 81, inverse quantization unit 86, inverse transformation unit 88, summer 90, and decoded picture buffer (DPB) 92. Prediction processing unit 81 includes motion compensation unit 82 and intra prediction processing unit 84. Video decoder 30B may, in some examples, perform a decoding pass generally reciprocal to the encoding pass described with respect to video encoder 20A from FIG. 2.

In the example of FIG. 3, video data memory 79 receives encoded video. Video data memory 79 may store video data (e.g., configured to store video data), such as an encoded video bitstream, to be decoded by the components of video decoder 30B. Video data memory 79 may also store video data that is used by components of video decoder 30B to decode the video data and reconstruct a picture.

The video data stored in video data memory 79 may be obtained from a local video source, such as a camera, via wired or wireless network communication of video data, or by accessing physical data storage media. Video data memory 79 may form a coded picture buffer (CPB) that stores encoded video data from an encoded video bitstream.

DPB 92 is one example of memory that stores reference video data for use in decoding video data by video decoder 30B (e.g., in intra-coding mode, and inter-coding mode). Video data memory 79 and DPB 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 79 and DPB 92 may be provided by the same memory device or separate memory devices. In various examples, video data memory 79 may be on-chip with other components of video decoder 30B, or off-chip relative to those components.

During the decoding process, video decoder 30B receives an encoded video bitstream that represents video blocks of an encoded video slice and associated syntax elements from video encoder 20A. Entropy decoding unit 80 of video decoder 30B entropy decodes the bitstream to generate quantized coefficients, motion vectors, and other syntax elements. Entropy decoding unit 80 forwards the motion vectors and other syntax elements to prediction processing unit 81. Video decoder 30B may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. Prediction processing unit 81 may be configured to implement the techniques of this disclosure for indicating which reference picture should be used for inter-prediction such as when a reference picture is not received. When the video frame is coded as an inter-coded (i.e., B, or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30B may construct the reference frame lists, RefPicList0 and RefPicList1, using default construction techniques based on reference pictures stored in DPB 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20A during encoding of the video blocks to calculate interpolated values for sub-integer pixels of reference blocks. In this case, motion compensation unit 82 may determine the interpolation filters used by video encoder 20A from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20A for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30B forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in DPB 92, which stores reference pictures used for subsequent motion compensation. DPB 92 also stores decoded video for later presentation on a display device, such as display device 31B of FIG. 1.

Video encoder 20A, video decoder 30B, video encoder 20B, and video decoder 30A may be configured to implement the techniques described in this disclosure. Again, for ease of description, the techniques are described with respect to video encoder 20A and video decoder 30B, and video encoder 20B and video decoder 30A may be configured to implement similar techniques. However, the techniques should not be considered limited to requiring video encoder 20B and video decoder 30A to perform the same techniques as those of video encoder 20A and video decoder 30B.

For example, the techniques described above are described with respect to an encoder on a sender side and a decoder on a receiver side. Video encoder 20A may be an example of such an encoder on the sender side, and video decoder 30B may be an example of such a decoder on the receiver side. In some examples, video decoder 30B may be configured to output the reference picture set selection indication (RPSSI) feedback message (e.g., as part of an RTP message). From the RPSSI feedback message, video encoder 20A may be configured to determine which reference pictures are available in the DPB 92 of video decoder 30B and may encode a picture based on one of the pictures known to be in DPB 92 of video decoder 30B.

As described above, the techniques described in this disclosure may be related to real-time video applications. For real-time video applications under best effort network conditions, feedback messages are important to inform a sender (e.g., video encoder 20A or device 12 that includes video encoder 20A) as to what happened at the receiver (e.g., video decoder 30B or device 14 that includes video decoder 30B). It should be understood that in video telephony or video conferencing, the sender may be device 12 or device 14, and the receiver may be device 12 or device 14. For ease of description, this disclosure describes device 12 as being the sender and device 14 as being the receiver, with the understanding that device 14 may also function as the sender, and device 12 may function as the receiver.

For example, in instances where video decoder 30B did not receive a picture from the bitstream signaled by video encoder 20A, it may be beneficial for video decoder 30B to transmit a feedback message to inform video encoder 20A that there is a missed picture. For the existing HEVC codec, when one of the reference pictures is missed by video decoder 30B, video decoder 30B can use the Reference Picture Selection Indication (RPSI) and Specific Picture Loss Indication (SPLI) messages, which are defined in "RTP Payload Format for High Efficiency Video Coding" by Wang et al. from the Network Working Group, dated Sep. 6, 2013, to inform video encoder 20A that pictures are missed.

Information regarding the RTP Payload Format for High Efficiency Video Coding can be found, as of Dec. 2, 2013, from http://tools.ietf.org/html/draft-ietf-payload-rtp-h265-01. For example, information regarding the RTP payload format describes that the RTP payload format allows for packetization of one or more Network Abstraction Layer (NAL) units in each RTP packet payload, as well as fragmentation of a NAL unit into multiple RTP packets. Furthermore, the RTP payload format supports transmission of an HEVC stream over a single as well as multiple RTP flows. The payload format has wide applicability in video-conferencing, Internet video streaming, and high bit-rate entertainment-quality video, among others.

There may be various ways in which video decoder 30B may determine that there was a missed picture. As one example, video decoder 30B may receive syntax elements in the encoded bitstream that instruct video decoder 30B to utilize the missed picture as a reference picture for decoding. In this case, video decoder 30B determines that the picture that is to be used as a reference picture is not stored in DPB 92 of video decoder 30B because the picture was missed, and video decoder 30B determines that a picture was missed in the bitstream. There may be other causes for why video decoder 30B determines that a picture was missed and other ways in which video decoder 30B determines that a picture was missed. The techniques described in this disclosure are not limited to any particular way in which video decoder 30B determines that a picture was missed.

The following description explains the functionality of RPSI messages for context in understanding the techniques described in this disclosure. SPLI messages are described much further below.

For RPSI, when an error happens, video decoder 30B chooses one earlier correctly decoded reference picture from DPB 92, and requests that video encoder 20A use that picture, typically a long term reference picture, for reference when encoding the next picture (i.e., the current picture that is being encoded). If this specified reference picture still exists in DPB 64 of video encoder 20A, video encoder 20A may encode the next picture with this reference to stop further error propagation.

In RPSI, video decoder 30B may specify the reference picture used for encoding. However, information indicating exactly all the pictures that are stored in DPB 92 of video encoder 20A may not be available to video decoder 30B. Instead, information that video decoder 30B can use to determine the pictures stored in DPB 64 of video encoder 20A at the time video decoder 30B transmitted the information specifying the reference picture may be inaccurate and out-of-date.

Accordingly, in some examples, video decoder 30B may result in specifying a reference picture that video encoder 20A should use for inter-prediction, which video encoder 20A already removed from DPB 64. In this case, video encoder 20A may not be able to use the identified picture that video decoder 30B identified as a reference picture for encoding since the identified picture was removed from DPB 64. In some examples, if the identified picture is not in DPB 64 of video encoder 20A, then video encoder 20A encodes a current picture as Intra Random Access Point (IRAP) to stop the error. However, encoding the current picture as IRAP may be costly in terms of coding efficiency.

To alleviate the problem that video decoder 30B identifies a picture to be used as a reference picture that is not stored in DPB 64 of video encoder 20A, in some examples, video encoder 20A and video decoder 30B may negotiate to use long-term reference (LTR) pictures (e.g., by some type of communication between video encoder 20A and video decoder 30B), which will be kept longer in both DPB 64 of video encoder 20A and DPB 92 of video decoder 30B. In some examples, rather than negotiating the use of LTR pictures, video decoder 30B may be pre-configured to identify an LTR picture as the reference picture that video encoder 20A is to use. In either example, video decoder 30B may specify an LTR picture that is currently stored in DPB 92 of video decoder 30B as the picture that is to be used for encoding the current picture about to be encoded by video encoder 20A. However, relying on LTR pictures may negatively impact coding efficiency because there may be lower temporal correlation since the LTR pictures may be further in temporal distance to the current picture being encoded as compared to other pictures (e.g., short-term reference pictures). In other words, in some cases (although not a requirement), long-term reference pictures tend be stored for a longer amount of time in DPB 64 and DPB 92, as compared to short-term reference pictures, and therefore, may be further in temporal distance to the current picture as compared to a short-term reference picture.

There may be other issues with existing techniques of the RPSI. For example, even if video decoder 30B does not identify an LTR picture and does identify a picture that is in DPB 64 of video encoder 20A, in some other techniques, video encoder 20A is required to use the picture identified by video decoder 30B for inter-predicting the current picture (i.e., the picture that is about to be encoded). Video encoder 20A uses the identified picture, assuming it is in DPB 64 of video encoder 20A, because the identified picture is guaranteed to exist in DPB 92 of video decoder 30B since the video decoder 30B selected the picture from DPB 92. However, there may be pictures other than the picture that video decoder 30B identified that are more suitable for inter-predicting the current picture. Moreover, being limited to using only the picture identified by video decoder 30B causes video encoder 20A to only utilize uni-prediction since bi-prediction uses two pictures. This further negatively impacts inter-prediction coding efficiency.

The techniques described in this disclosure may address one or more of the issues described above with the RPSI. For example, in the techniques described in this disclosure, video decoder 30B may output information identifying a previously decoded picture in DPB 92; however, video encoder 20A may not be limited to using only the identified picture for inter-predicting the current picture.

Rather, video encoder 20A may determine one or more pictures that are available in both DPB 64 of video encoder 20A and DPB 92 of video decoder 30B from the identified picture. Video encoder 20A may select one or more of the determined pictures and potentially the identified picture, as well, for inter-predicting the current picture. In this manner, video encoder 20A may be configured to select from a large set of pictures, other than just one picture, and determine which pictures provide better coding efficiency and select those pictures for inter-predicting the current picture.

Moreover, video encoder 20A may be configured to determine pictures that are available in the respective DPBs (e.g., DPB 64 and DPB 92) of both video encoder 20A and video decoder 30B with minimal signaling from video decoder 30B. For instance, with the signaling only a few pictures (e.g., one or a select few pictures), video encoder 20A may be configured to determine more pictures (e.g., a plurality of pictures) that are available in both DPB 64 of video encoder 20A and DPB 92 of video decoder 30B. For purposes of illustration, this disclosure describes video decoder 30B identifying one picture, but the disclosure should not be considered so limiting.

In the techniques described in this disclosure, video encoder 20A may make a more optimal decision for error recovery (e.g., for the example case where there is a missed picture) once video encoder 20A determines the reference pictures in the DPB 92 of video decoder 30B. For example, video decoder 30B should inform video encoder 20A of all the reference pictures in DPB 92 of video decoder 30B. In some examples, video encoder 20A may determine the exact reference pictures in DPB 92 of video decoder 30B and may determine an error recovery mode (e.g., which pictures to use for inter-predicting the current picture) based on the determined reference pictures in DPB 92 of video decoder 30B.

For video encoder 20A to determine the exact reference pictures in DPB 92 of video decoder 30B, video decoder 30B may signal all reference pictures in DPB 92 of video decoder 30B to video encoder 20A. However, such signaling may be bandwidth inefficient, and, in the techniques described in this disclosure, video decoder 30B may signal one picture from which video encoder 20A may determine a plurality of pictures that are available for encoding or decoding the current picture.

One example manner in which video encoder 20A may determine which picture stored in DPB 64 is also stored in DPB 92 of video decoder 30B is using the reference picture subsets defined in the HEVC standard. The pictures stored in DPB 64 of video encoder 20A that are also determined to be stored in DPB 92 of video decoder 30B are referred to as pictures available for video encoding or video decoding. Again, it should be understood that the pictures determined to be available for video encoding or decoding need not include all of the pictures in the respective DPBs. Rather, video encoder 20A may implement certain procedures to determine which pictures are stored in the DPBs of both video encoder 20A and video decoder 30B (e.g., both DPB 64 and DPB 92).

The HEVC standard defines five reference picture subsets that together form a reference picture set. In the HEVC standard, video encoder 20A and video decoder 30B may each construct the reference picture subsets for each picture. For example, for encoding or decoding a picture, prediction processing unit 41 of video encoder 20A and prediction processing unit 81 of video decoder 30B may construct reference picture lists (e.g., RefPicList0 and RefPicList0) based on the constructed reference picture subsets for that picture, and inter-prediction encode or decode that picture based on the constructed reference picture lists.

The reference picture subsets and sets, for the HEVC standard, are described in more detail in SERIES H: AUDIOVISUAL AND MULTIMEDIA SYSTEMS, Infrastructure of audiovisual services—Coding of moving video, High efficiency video coding ITU-T Recommendation H.265, dated Apr. 4, 2013 and referred to herein as "High Efficiency Video Coding, Rec. ITU-T H.265 and ISO/IEC 23008-2".

For example, for encoding or decoding a particular picture, video encoder 20A and video decoder 30B may construct the five reference picture subsets, which include: RefPicSetStCurrBefore, RefPicSetStCurrAfter, RefPicSetStFoll, RefPicSetLtCurr, and RefPicSetLtFoll. RefPicSetStCurrBefore, RefPicSetStCurrAfter and RefPicSetLtCurr include all the pictures that may be used for decoding the particular picture. In some examples, RefPicSetStCurrBefore may include any reference pictures determined to be short-term reference pictures that are displayed before the particular picture, and RefPicSetStCurrAfter may include any reference pictures determined to be short-term reference pictures that are displayed after the particular picture. RefPicSetLtCurr may include any long-term reference pictures. RefPicSetStFoll and RefPicSetLtFoll include any reference pictures that are not used for encoding or decoding the particular picture, but may be used for the pictures that follow the particular picture in decoding order. RefPicSetStFoll may include any reference pictures determined to be short-term reference pictures, and RefPicSetLtFoll may include any reference pictures determined to be long-term reference pictures. In some examples, the pictures in the sets may be exclusive (e.g., a picture in one of the sets may not be in any other set).

In some examples, the construction of the five sets may be explicit. For example, mere existence of a picture in the DPB should not be considered as a reference picture that belongs to one of these five sets. Rather, a picture identified in one of these sets is a picture specifically determined as a picture that can be used for encoding or decoding the particular picture and pictures following the particular picture in decoding order, or only pictures following the particular picture in decoding order.

In some examples, video encoder 20A and video decoder 30B may construct reference picture list(s) based on the reference picture set. Indices into the reference picture list(s) may identify the reference picture(s) used to inter-predict encode or inter-predict decode the particular picture for which video encoder 20A and video decoder 30B constructed the reference picture set. Hence, reference pictures in the five example subsets are specifically determined to be pictures that belong in these subsets because it is from these pictures that the reference picture lists are formed.

A picture determined to be a short-term reference picture or a long-term reference picture does not mean that such a picture belongs in one of the example reference picture subsets. Again, the reference picture subsets include pictures specifically determined to belong to those reference picture subsets, which specifies characteristic as to their usability for inter-prediction encoding or decoding the particular picture and/or pictures following the particular picture in decoding order.

In some examples, the techniques described in this disclosure utilize the reference picture subsets to determine which stored in DPB 64 of video encoder 20A are also stored in DPB 92 of video decoder 30B. As described above, in the RPSI message, video decoder 30B transmit information identifying a picture, and video encoder 20A is required to use the identified picture for inter-predicting the current picture, assuming the identified picture is stored in DPB 64 of video encoder 20A at the time video encoder 20A is inter-predicting the current picture. To avoid confusion, this disclosure uses the term Reference Picture Set Selection Indication (RPSSI) feedback message, to indicate that video encoder 20A is utilizing the techniques described in this disclosure, which are separate from the RPSI. However, the usage of the term "RPSSI" is merely to avoid confusion. It may be possible to redefine the term "RPSI" to include the techniques described in this disclosure.

In some examples, video encoder 20A may receive information identifying a picture from video decoder 30B. Video encoder 20A may determine which pictures in one or more reference picture subsets of the identified picture are still stored in DPB 64. For example, video encoder 20A may store information indicating the constructed reference picture subsets for each picture that video encoder 20A encodes. Video encoder 20A may retrieve the information indicating the pictures that could have been used to inter-predict the identified picture from the stored information, and determine which pictures that could have been used to inter-predict the identified picture are still stored in DPB 64.

In general, if a picture, which could have been used to inter-predict the identified picture and pictures following the identified picture in coding order, is still stored in DPB 64 of video encoder 20A, there is a very high likelihood (virtually guaranteed) that the picture will also be stored in DPB 92 of video decoder 30B. As used in this disclosure, a picture that could have been used to inter-predict the identified picture and pictures following the identified picture in coding order means a picture that could have been a reference picture to the identified picture and pictures following the identified picture in coding order. Also, a picture that could have been used to inter-predict the identified picture and pictures following the identified picture in coding order includes any pictures that were actually used to inter-predict the identified picture.

In some examples, video decoder 30B may clear a picture from DPB 92 only after video encoder 20A clears the picture from DPB 64. Therefore, if video encoder 20A did not clear a picture that could have been a reference picture for the identified picture (e.g., used to inter-predict the identified picture), then there is a very high probability that video decoder 30B did not clear that picture from DPB 92.

It should be understood that there is no guarantee that the DPBs of video encoder 20A and video decoder 30B be the exact same (e.g., the pictures stored in DPB 64 and DPB 92 need to be the exact same set of pictures). However, if a picture that could have been used to inter-predict the identified picture is stored in DPB 64 of video encoder 20A, then that picture exists in DPB 92 of video decoder 30B, even if there are pictures in DPB 64 of video encoder 20A that are not in DPB 92 of video decoder 30B and even if there are picture in DPB 92 of video decoder 30B that are not in DPB 64 of video encoder 20A.

One way that video encoder 20A determines which pictures could have been used to inter-predict the identified picture is through the reference picture subsets of the identified picture. For example, video encoder 20A may determine whether pictures in the RefPicSetStCurrBefore, RefPicSetStCurrAfter, RefPicSetLtCurr, RefPicSetLtFoll, and RefPicSetStFoll reference picture subsets of the identified picture are still available in DPB 64 of video encoder 20A (e.g., based on stored information of the identified picture for the time video encoder 20A encoded the identified picture). As described above, the RefPicSetStCurrBefore, RefPicSetStCurrAfter, and RefPicSetLtCurr subsets include pictures that could have been used to inter-predict the identified picture and pictures following the identified picture in coding order. The RefPicSetLtFoll and RefPicSetStFoll subsets include picture that could have been used to inter-predict pictures following the identified picture in coding order, but not the identified picture.

The pictures in one or more of the reference picture subsets of the identified picture that are stored in DPB 64 of video encoder 20A are referred to as picture available for coding (or candidate reference pictures). In some examples, video encoder 20A may determine pictures that are in any of the reference picture subsets of the identified picture as candidate reference pictures that can be used to inter-predict the current picture (i.e., that are available to inter-predict the current picture or are available as reference pictures for the current picture). In some examples, video encoder 20A may further determine pictures that are in any of the reference picture subsets of the pictures in the reference pictures subsets of the identified picture that are stored in DPB 64 of video encoder 20A.

In some examples, video encoder 20A may determine pictures that are only in one of the RefPicSetStCurrBefore, RefPicSetStCurrAfter, and RefPicSetLtCurr subsets of the identified picture as candidate reference pictures that available for inter-predicting the current picture (i.e., that available as reference pictures for the current picture). For instance, in some examples, due to sub-bitstream extraction that may occur prior to video decoder 30B receiving the bitstream, the pictures in the RefPicSetStFoll and RefPicSetLtFoll subset (i.e., pictures that could not have been used to inter-predict the identified pictures, and only pictures following the identified picture) may be removed from the bitstream.

In this special case, the DPB 64 of video encoder 20A may include pictures of the reference picture set of the identified picture that are not available in the DPB 92 of video decoder 30B. Because video encoder 20A may not be able to determine whether sub-bitstream extraction is enabled, to avoid issues where reference pictures are not available, video encoder 20A may determine pictures that can be used to inter-predict the identified picture, and not just pictures following the identified picture, as candidate reference pictures that can be used to inter-predict the current picture. Again, RefPicSetStCurrBefore, RefPicSetStCurrAfter, and RefPicSetLtCurr subsets of the identified picture include pictures that could have been used to inter-predict the identified picture, and therefore, video encoder 20A may determine pictures that are available for inter-predicting the current picture only from pictures in the RefPicSetStCurrBefore, RefPicSetStCurrAfter, and RefPicSetLtCurr subsets of the identified picture that are still available in DPB 64 of video encoder 20A.

In some examples, video encoder 20A may determine pictures that are in the short-term reference picture subsets that could have been used to inter-predict the identified picture (i.e., RefPicSetStCurrBefore and RefPicSetStCurrAfter). This may be because the temporal correlation of long-term reference pictures is relatively poor, and to reduce processing time, there may be little to no benefit in having video encoder 20A evaluate long-term reference pictures for inter-prediction purposes.

To further reduce processing time, in some examples, video encoder 20A may determine pictures that are short-term reference pictures that could have been used to inter-predict the identified picture that are displayed earlier than the identified picture (i.e., pictures in the RefPicSetStCurrBefore subset) as candidate reference pictures that can be used to inter-predict the current picture. As another example, video encoder 20A may determine pictures that are short-term reference pictures that could have been used to inter-predict the identified picture that are displayed after the identified picture (i.e., pictures in the RefPicSetStCurrFoll subset) as candidate reference pictures that can be used to inter-predict the current picture.

After video encoder 20A determines which pictures are available for inter-predicting the current picture based on candidate reference pictures that could have been used to inter-predict the identified picture and pictures following the identified picture, video encoder 20A may select one or more of the determined pictures to inter-predict the current picture. In addition to the pictures that could have been used to inter-predict the identified picture, the picture identified by video decoder 30B is also a candidate reference picture that can be used to inter-predict the current picture. Video encoder 20A may include the pictures used to inter-predict current picture in the reference picture set (RPS) of the current picture, and construct reference picture lists that include the selected pictures, and inter-predict encode the current picture based on the constructed reference picture list.

Because the selected pictures are in the RPS of the current picture, video decoder 30B may similarly construct reference picture lists that are identical to those constructed by video encoder 20A, and therefore, include the selected pictures in the reference picture lists. Video decoder 30B may then inter-prediction decode the current picture based on the reference picture lists.

In some examples, video decoder 30B may identify a picture that is not stored in DPB 64 of video encoder 20A. For example, video encoder 20A may have already flushed the identified picture, before video decoder 30B flushed the identified picture. In examples where DPB 64 of video encoder 20A does not store the identified picture, video encoder 20A may intra-predict the current picture as an (intra-refresh random access point picture) IRAP.

In some examples, even if the picture that video decoder 30B identified is available in DPB 64 of video encoder 20A, video encoder 20A may still intra-predict the current picture. For instance, if the coding efficiency is poorer (or no better) using one or more of the candidate reference pictures to inter-predict the current picture than intra-predicting the current picture, video encoder 20A may intra-predict the current picture, possibly as an IRAP.

Accordingly, in the techniques described in this disclosure, video decoder 30B may inform video encoder 20A via a unique identifier to a picture in order to describe the preferred set of available reference pictures in DPB 92 of video decoder 30B that can be used by video encoder 20A to determine available reference pictures both at video encoder 20A and video decoder 30B (e.g., determine available reference pictures stored in DPB 64 and DPB 92). The unique identifier (e.g., the information identifying a picture) may comprise a picture order count (POC) value of the picture. For instance, each picture may be associated with a unique POC value that identifies the order in which the picture is displayed or outputted. A picture with a smaller POC value is displayed or outputted earlier than a picture with a larger POC value. The POC value is just one example of a unique identifier used by video decoder 30B to identify the picture, and other ways to identify the picture may be possible.

In this manner, the common reference pictures available at both video encoder 20A and video decoder 30B can be used for establishing common reference between video encoder 20A and video decoder 30B (i.e., once video encoder 20A determines pictures that are available in DPB 64 of video encoder 20A and in DPB 92 of video decoder 30B, video encoder 20A may determine which pictures to use for inter-predicting the current picture). In some examples, the reference pictures associated with a picture identifier (i.e., identified picture) are described as all the available reference pictures after decoding the picture whose identifier is sent (i.e., all pictures that could have been used to inter-predict the identified picture and pictures following the identified picture in coding order).

In some examples, the indicator may indicate all the available reference pictures before decoding the indicated picture (i.e., pictures in the RefPicSetStCurrBefore subset of the identified picture), or pictures after decoding the indicated picture (i.e., pictures in the RefPicSetStCurrAfter subset of the identified picture). Once video encoder 20A establishes the DPB state of DPB 92 of video decoder 30B with the associated reference pictures at the video decoder 30B (receiver) side, video encoder 20A can make a choice of references for establishment of a common reference set. Alternatively, video encoder 20A can send an IRAP picture (e.g., an intra-predicted picture such as an intra-refresh random access point picture).

As described above, video encoder 20A may also avoid referring to RefPicSetStFoll and RefPicSetLtFoll pictures in the signaled reference pictures, since these pictures may not be available on the receiver side (e.g., video decoder 30B) due to possible sub-bitstream extraction performed on the original bitstream. In some examples, an intermediate device such as media access network element (MANE) device may perform sub-bitstream extraction in which pictures that can only be used to inter-predict pictures following the current picture in decoding order are extracted.

As also described above, the indicator (i.e., the information identifying the picture) may be the PicOrderCntVal (POC value) specified in the HEVC spec ("High Efficiency Video Coding, Rec. ITU-T H.265 and ISO/IEC 23008-2") (32-bit signed value) or something that is equivalent to uniquely identifying the POC value of the picture. In addition to the PicOrderCntVal, the nuh_layer_id, as specified in HEVC spec., may be signaled for multi-layer bitstreams similar to the ones in the current RPSI, SPLI syntax in draft HEVC RTP payload specification (i.e., "RTP Payload Format for High Efficiency Video Coding").

Accordingly, in one or more examples, video encoder 20A may receive, from device 14 that includes video decoder 30B, information identifying a previously decoded picture that is stored in DPB 64 of video decoder 30B at the time video decoder 30B transmitted the information. Video encoder 20A may determine one or more candidate reference pictures that are available for encoding a current picture based on the identified picture. The one or more candidate reference pictures include one or more pictures that were previously determined to be usable for inter-prediction encoding one or more of the identified picture or pictures following the identified picture in coding order, and that are still stored in DPB 64 of video encoder 20A at the time of encoding the current picture. Video encoder 20A may select one or more reference pictures for the current picture from the determined one or more candidate reference pictures and the identified picture. Video encoder 20A may inter-prediction encode the current picture based on the selected one or more reference pictures.

The one or more pictures that were previously determine to be usable for inter-prediction encoding one or more of the identified picture or pictures following the identified picture in coding order include pictures from one or more reference picture subsets that video encoder 20A constructed during the encoding of the identified picture. Again, the identified picture is a previously decoded picture by video decoder 30B, which means that video encoder 20A encoded the identified picture before encoding the current picture.

Because the techniques described in this disclosure allow video encoder 20A to determine a plurality of candidate reference pictures, video encoder 20A may bi-prediction encode the current picture based on two pictures from the selected reference pictures. Such bi-prediction encoding may allow additional inter-prediction options that would otherwise be unavailable if video encoder 20A was limited to only using the identified picture for inter-prediction.

For decoding, video decoder 30B may output, to device 12 that includes video encoder 20A, information identifying a previously decoded picture stored in DPB 92 of video decoder 30B at the time of outputting the information. Video decoder 30B may inter-prediction decode a current picture with one or more candidate reference pictures. The one or more candidate reference pictures include one or more pictures that were previously determined, by video encoder 20A, to be usable for inter-prediction encoding the identified picture. In some examples, video decoder 30B may determine that a picture was missed (e.g., video decoder 30B did not receive information to properly or fully reconstruct the missed picture). Video decoder 30B may be configured to output information based on a determination that the picture was missed. Also, because video encoder 20A may be able to bi-prediction encode the current picture from two pictures, video decoder 30B may be configured to bi-prediction decode the current picture based on two pictures from the candidate reference pictures.

Video decoder 30B may communicate the information identifying a previously decoded picture stored in DPB 92 of video decoder 30B at the time of outputting the information via the link 16. In some examples, video decoder 30B may communicate the information via the communication link or protocol used to communicate the video bitstream from video encoder 20A to video decoder 30B (e.g., a two way signaling protocol, including an RTP). For example, the information may be communicated from video decoder 30B to video encoder 20A via a new or existing signaling mechanism or message.

In some examples, the techniques introduce a Reference Picture Set Selection Indication (RPSSI) feedback message, which in some examples communicates the information identifying a previously decoded pictures stored in DPB 92 of video decoder 30B to video encoder 20A. In one example, described in more detail below the RPSSI message is signaled as part of an RTP protocol session that communicates the encoded video bitstream. For example, the RPSSI feedback message may replace the RPSI message, may be used in addition to the RPSI message to differentiate when to use existing techniques and techniques described in this disclosure, or the RPSI message may be modified to indicate that techniques described in this disclosure are to be implemented. For ease of description, the following describes the message as the RPSSI feedback message, but that is merely to ease with understanding and should not be considered limiting or limited to the specific example described below.

The RPSSI feedback message may be identified by PT=PSFB and FMT=9. There may be one RPSSI (and in some examples must be exactly one RPSSI) contained in the FCI field. Table 1 below illustrates on example of the format of the RPSSI.

TABLE 1

The PCI format of the RPSSI

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      PB       |0| Payload Type|    Native RPSSI bit string    |
+-+-+-+-+-+-+-+-+-+-+-+-+-+-+-+-+-+-+-+-+-+-+-+-+-+-+-+-+-+-+-+-+
|   defined per codec              ...           | Padding (0)  |
+-+-+-+-+-+-+-+-+-+-+-+-+-+-+-+-+-+-+-+-+-+-+-+-+-+-+-+-+-+-+-+-+
```

In the example of Table 1, PB is 8 bits. PB may define the number of unused bits required to pad the length of the RPSSI message to a multiple of 32 bits. In Table 1, 0 is 1 bit. This bit may be set to zero (e.g., must be set to zero) upon transmission and may be ignored upon reception. In Table 1, Payload Type is 7 bits. Payload Type may indicate the RTP payload type in the context of which the native RPSSI bit string may (e.g., must) be interpreted. In Table 1, Native RPSSI bit string is variable length. Native RPSSI may indicate the SPLI information as natively defined by the video codec. In Table 1, Padding may be #PB bits. A number of bits set to zero to fill up the contents of the RPSSI message to the next 32-bit boundary. The number of padding bits may (e.g., must) be indicated by the PB field.

In some examples, the same timing rules as for the RPSI message, as defined in [RFC4585], apply for the RPSSI message. The field "Native RPSSI bit string defined per codec" may be a base 16 [RFC4648] representation of the 8 bits consisting of 2 most significant bits equal to 0 and 6 bits of nuh_layer_id, as defined in HEVC, followed by the 32 bits representing the value of the PicOrderCntVal, as defined in HEVC, for the picture that is indicated for signaling the presence of available reference pictures at the receiver side.

Although the above example techniques are described with respect to the HEVC standard, the techniques described in this disclosure are not necessarily so limited. For example, the techniques may be used with other codecs such as codec compliant with H.264/AVC as wells as other video compression standards or even proprietary video compression techniques. The following describes one example way in which the techniques may be used with the H.264/AVC codec.

In either of the example techniques, one advantage may be that by signaling a single picture identifier, a complete reference picture set consisting of multiple frames/pictures can be signaled. In other words, video decoder 30B signals information identifying a few pictures (e.g., one picture), and from that information, video encoder 20A can determine a more pictures (e.g., a plurality pictures) that can be used to inter-predict the current picture. This allows for efficient bandwidth utilization by video decoder 30B, while promoting video coding efficiency by video encoder 20A.

In some video techniques, other than video techniques in accordance with HEVC, video encoder 20A may not be pre-configured to determine and maintain a list of pictures that could be used to inter-predict a picture and pictures following the picture in the coding order. For example, if video encoder 20A were configured based on the H.264/AVC standard, then video encoder 20A may be configured to determine pictures that could have been used to inter-predict the identified picture (e.g., as part of the process video encoder 20A implemented when previously encoding the identified picture), but may not be configured to maintain a list of pictures that could have been used to inter-predict the picture identified by video decoder 30B. For example, after encoding the identified picture, video encoder 20A may discard information indicating which pictures could have been used to inter-predict the identified picture. In other words, video encoder 20A, configured in accordance with H.264/AVC, may not construct reference picture subsets in the manner video encoder 20A would have if configured in accordance with HEVC.

For examples where video encoder 20A is not configured in accordance with HEVC, video encoder 20A may be configured to (e.g., designed to in this case) maintain the list of pictures for each picture that could have used to inter-predict a picture, such as in memory of video encoder 20A, so that the information is available for the identified picture. In this manner, even for video encoder 20A configured in accordance with H.264/AVC, it may be possible for video encoder 20A to implement the example techniques described in this disclosure.

Similarly, some examples of a video decoder that are configured in accordance with H.264/AVC may not support outputting information identifying a previously decoded picture. For such examples, video decoder 30B may be specifically configured to support outputting information identifying a previously decoded picture to implement the example techniques described in this disclosure.

The preceding description described example techniques in which video encoder 20A may determine a plurality of candidate reference pictures that will be available for decoding by video decoder 30B for inter-prediction encoding a current picture based on information outputted by video decoder 30B. However, this disclosure is not limited to the above example techniques. The following describes some additional example techniques that may be used in conjunction with the above example techniques or separate from the above example techniques.

In some examples, for each missed reference picture at the decoder side (e.g., for each picture that video decoder 30B misses), video decoder 30B sends a unique identifier of this picture (e.g., missed picture), such as its POC value to video encoder 20A like an SPLI message (the SPLI message is described in more detail below). Besides (e.g., in addition), video decoder 30B may send a unique identifier of the picture that video decoder 30B is currently decoding to video encoder 20A. The picture that video decoder 30B is currently decoding is a picture that video encoder 20A previously encoded. With the identifier of picture video decoder 30B was decoding at the time video decoder 30B outputted the information identifying the picture, video encoder 20A may determine which reference pictures are supposed to be stored in DPB 92 of video decoder 30B.

For example, as described above, as part of decoding a picture, video decoder 30B constructs the reference picture subsets for the picture, and constructs the reference picture lists for that picture from the reference picture subsets. In this example, video encoder 20A receives information of the picture that video decoder 30B was decoding at the time video decoder 30B transmitted the information, and determines the reference picture subsets (or, more generally, the parameter set to cover H.264/AVC) to determine which pictures are available in DPB 92 of video decoder 30B. Also, video encoder 20A may determine that the picture that video decoder 30B indicated as being missed is not in DPB 92 of video decoder 30B. Therefore, except for the missed reference pictures reported from video decoder 30B, the remaining reference pictures should all exist in DPB 92 of video decoder 30B. In general, because only a few reference pictures are lost, video decoder 30B may output information identifying missed pictures only a few times (e.g., few reference pictures are lost, only few message are required to be sent). Accordingly, this example technique may be relative bandwidth efficient.

As another example, similar to the above example, video decoder 30B may output information identifying a missed picture, and video encoder 20A may receive such information identifying the missed picture. Video encoder 20A may exclude the missed picture from the determined one or more candidate reference pictures. In this way, video decoder 30B may inter-prediction decode the current picture with one or more candidate reference pictures except the missed picture.

As yet another example technique that may be used with the above techniques or separately from the above techniques, for each correctly decoded reference picture in DPB 92 of video decoder 30B, video decoder 30B outputs to video encoder 20A a unique identifier of this picture, such as its POC value, by one feedback message. This example technique may be similar as sending several RPSI messages together. However, the difference is that video encoder 20A may determine which reference pictures to use, rather than video decoder 30B specifying one reference picture for the picture to be used for inter-prediction encoding the current picture.

In this example, video decoder 30B may output information identifying each picture that video decoder 30B was able to correctly reconstruct that is stored in DPB 92 of video decoder 30B. Video encoder 20A may determine which of the pictures, for which video encoder 20A received such information, is still available in DPB 64 of video encoder 20A. Video encoder 20A may then use one or more of these pictures for inter-prediction encoding the current picture. When there are lots of reference pictures in DPB 92 of video decoder 30B, video decoder 30B may output many feedback messages together to video encoder 20A. Accordingly, this example technique may be relatively bandwidth inefficient, but with better guarantee that video encoder 20A inter-prediction encoded the current picture with reference pictures that are available in DPB 92 of video decoder 30B.

In accordance with one or more techniques of this disclosure, video decoder 30B may transmit information, to video encoder 20A, indicative of reference pictures available for decoding. Video decoder 30B may then receive video data for a picture that is inter-prediction encoded with one or more of the reference pictures. Video decoder 30B may inter-prediction decode the picture based on the video data.

In some examples, video decoder 30B may transmit information to video encoder 20A indicative of reference pictures available for decoding if an error occurred in reconstruction of a reference picture during decoding. In some examples, to transmit information to video encoder 20A indicative of reference pictures available for decoding, video decoder 30B may transmit information identifying a picture identified in a reference picture set from which reference pictures included in the reference set can be determined as the reference pictures available for decoding at video decoder 30B.

In accordance with one or more examples, video decoder 30B may output, to device 12 that includes video encoder 20A, information identifying a previously decoded picture stored in DPB 92 of video decoder 30B at the time of outputting the information. Video decoder 30B may inter-prediction decode a current picture with one or more candidate reference pictures. The one or more candidate reference pictures include one or more pictures that were previously determined, by video encoder 20A, to be usable for inter-prediction encoding the identified picture. In some examples, video decoder 30B may determine that a picture was missed. Video decoder 30B may output information identifying a previously decoded picture based on a determination that the picture was missed.

Video encoder 20A may select two pictures from the selected candidate reference pictures to bi-prediction encode the current picture. Accordingly, video decoder 30B may bi-prediction decode the current picture based on two pictures from the candidate reference pictures.

Moreover, in addition to outputting information identifying a previously decoded picture, video decoder 30B may output information identifying a missed picture. In such examples, video decoder 30B may inter-prediction decode the current picture with one or more candidate reference pictures except the missed picture.

Figure 4:
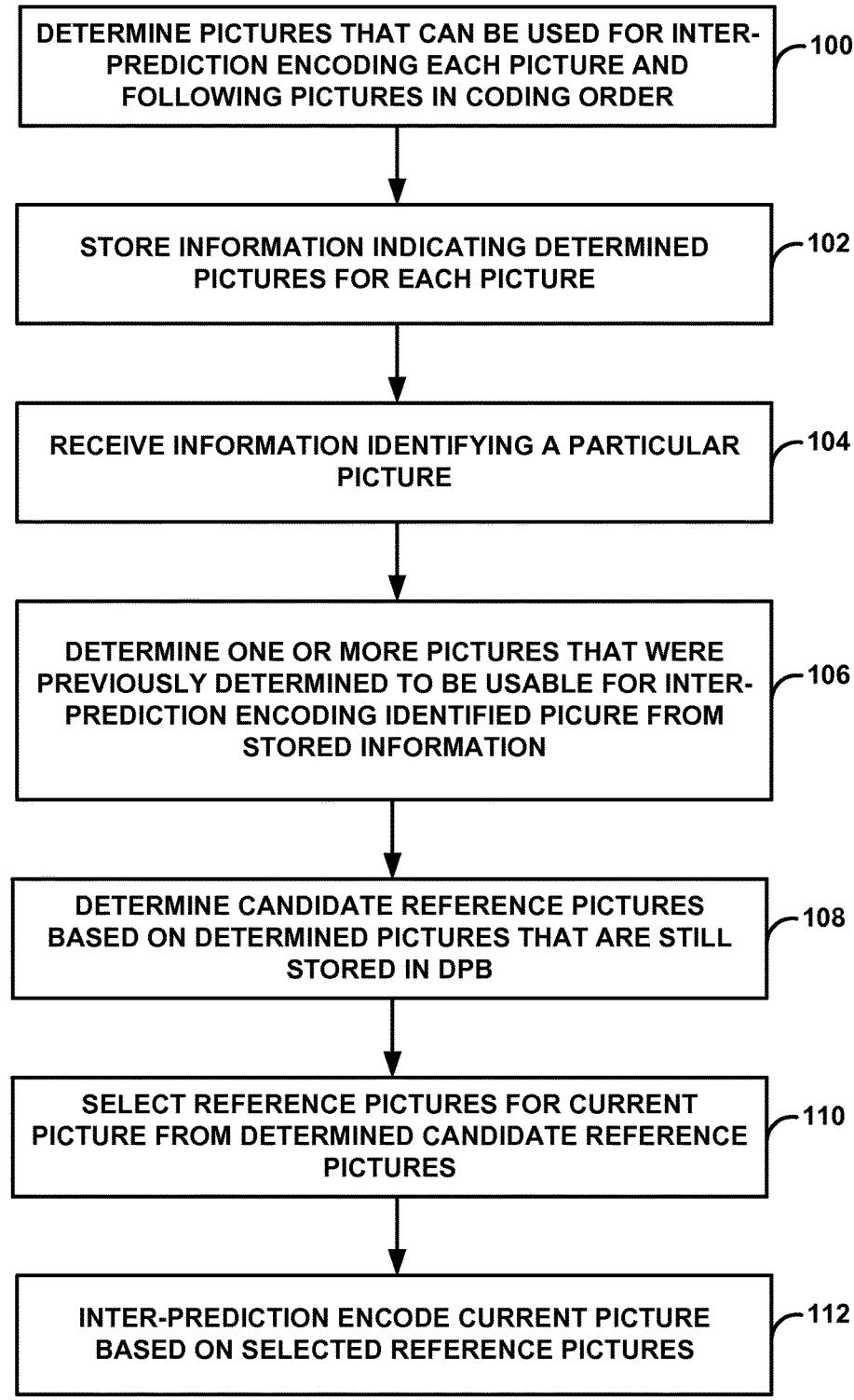
FIG. 4 is a flowchart illustrating an example method of encoding video data.

FIG. 4 is a flowchart illustrating an example method of encoding video data. For purposes of illustration, the example is described with respect to video encoder 20A. Video encoder 20A may determine pictures that can be used for inter-prediction encoding each picture and following pictures in coding order (100). For example, as part of encoding each picture, video encoder 20A may be configured to determine a parameter set for the picture (e.g., the one or more reference picture subsets as defined in HEVC or maintaining the parameter set in video coding techniques that are not necessarily in accordance with HEVC). Video encoder 20A may store information indicating determined pictures (e.g., pictures of the parameter set) for each picture (102).

Video encoder 20A may receive information identifying a particular picture (e.g., by its POC value) (104). Video encoder 20A may determine one or more pictures that were previously determined to be usable for inter-prediction encoding the identified picture from the stored information (106). In some examples, video encoder 20A may also determine one or more pictures that were previously determined to be usable for inter-prediction encoding the pictures that were previously determined to be usable for inter-prediction encoding the identified picture.

From the pictures that video encoder 20A determined to be usable for inter-prediction encoding the identified picture (and possibly determined to be usable for inter-prediction encoding the pictures determined to usable for inter-prediction encoding the identified picture), video encoder 20A may determine which of these pictures is still stored in DPB 64 of video encoder 20A (108). Video encoder 20A may select one or more reference pictures (e.g., one reference picture for uni-directional prediction from one reference picture list or two reference pictures for bi-directional prediction from reference pictures in each of the two reference picture lists) from the determined candidate reference pictures (110). Video encoder 20A may inter-prediction encode the current picture based on the selected reference pictures (112).

Figure 5:
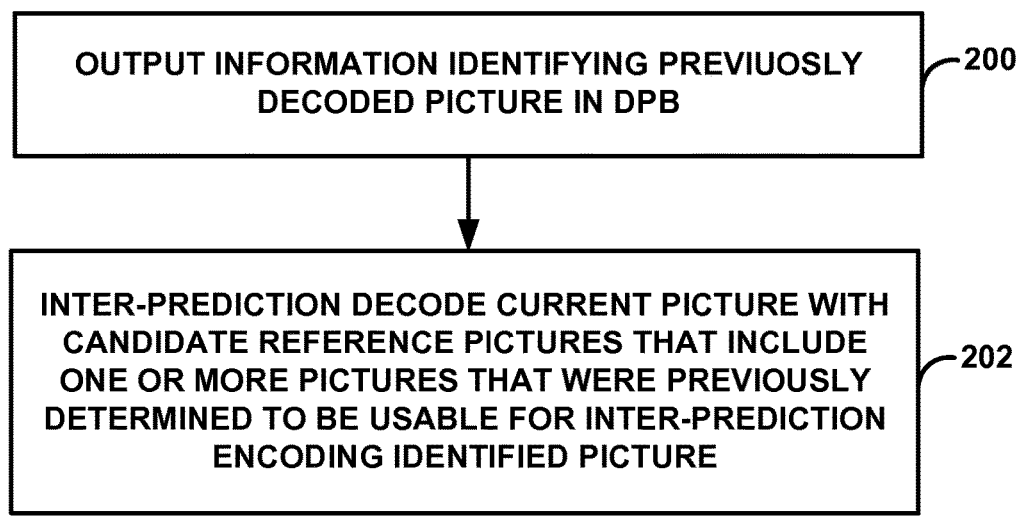
FIG. 5 is a flowchart illustrating an example method of decoding video data.

FIG. 5 is a flowchart illustrating an example method of decoding video data. For ease of description the example is described with respect to video decoder 30B. Video decoder 30B may output, to device 12 that includes video encoder 20A, information identifying a previously decoded picture stored in DPB 92 of video decoder 30B at the time of outputting the information (200). In some examples, video decoder 30B may determine that a picture was missed. Video decoder 30B may be configured to output the information identifying the previously decoded picture based on a determination that the picture was missed.

Video decoder 30B may inter-prediction decode a current picture with one or more candidate reference pictures (202). The one or more candidate reference pictures include one or more pictures that were previously determined, by video encoder 20A, to be usable for inter-prediction encoding the identified picture and/or pictures identified to be usable for inter-prediction encoding the pictures that were identified to be usable for inter-prediction encoding the identified picture. The identified picture may also be part of the one or more candidate reference pictures.

For example, if video encoder 20A bi-prediction encoded the current picture, video decoder 30B may bi-prediction decode the current picture in a substantially similar way. Also, in some examples, video decoder 30B may additionally output information identifying a missed picture. In such examples, video decoder 30B may inter-prediction decode the current picture with one or more candidate reference pictures except the missed picture.

The above described techniques related to the RPSI and RPSSI (again, the definition of RPSI may be changed to include the definition of RPSSI). In some examples, video encoder 20A and video decoder 30B may utilize the specific picture loss indication (SPLI) messages. For SPLI, when error happens, video decoder 30B only reports lost or partially lost reference pictures. Video encoder 20A tracks errors according to the SPLI messages, and once video encoder 20A can infer a reference picture which is correctly decoded and still exists in DPB 92 of video decoder 30B, video encoder 20A can use this reference picture to encode the current picture to stop error propagation.

For SPLI messages, since video decoder 30B may only report which pictures are lost, then video encoder 20A may only infer which reference pictures are available in DPB 92 of video decoder 30B based on the received messages. However, video encoder 20A may not be able to determine when the error happened on the side of video decoder 30B (i.e., video encoder 20A may not determine the exact state of DPB 92 of video decoder 30B when the errors were reported). In some cases, it may be complicated for video encoder 20A to exactly infer the pictures stored in DPB 92 of video decoder 30B, as illustrated in example of Table 2.

TABLE 2

REFERENCE STRUCTURE

| | # | # | # | # | # |
| | # | # | # | # | # |
| | # | # | # | # | # |
| POC | t | t + 1 | t + 2 | t + 3 | t + 4 |
| DPB | | (t) | (t + 1, t*) | (t, t + 1*) | (t + 1, t + 3) |

Table 2 indicates a reference structure. In Table 2, * means this picture is kept in DPB, but not used for current picture decoding, and POC stands for picture order count, which indicates when a picture is to be displayed. For instance, a picture with a smaller POC value is displayed earlier than a picture with a larger POC value. The display order of the pictures may be different than encode or decode order of the pictures.

In Table 2, video encoder 20A uses the illustrated reference structure. There are two cases: Case 1: only picture t+1 is lost, decoder notices this loss when decoding picture t+2, and then sends an SPLI message to inform encoder that picture t+1 is lost, and Case 2: both picture t+1 and picture t+2 are lost, decoder notices this unintentional loss when decoding picture t+4, and then decoder sends an SPLI message to inform encoder that picture t+1 is lost.

In some examples, video decoder 30B may not report reference picture loss when the missed reference picture is not used for current picture decoding, because this reference picture may be discarded intentionally. Comparing these two cases, video encoder 20A may not be able to distinguish them only by the received SPLI messages. That is, video encoder 20A may not infer whether picture t+3 is available or not in the DPB of video decoder 30B.

In the above example techniques, video decoder 30B outputs information identifying a few pictures (e.g., one picture or a select few pictures) from which video encoder 20A determines more pictures (e.g., a plurality of pictures) that can be used to inter-prediction encode the current picture. However, in some examples, video decoder 30B outputting information identifying a few pictures may not be sufficient to trigger video encoder 20A to determine pictures that video encoder 20A can use to inter-prediction encode a current picture. In such examples, in addition to outputting information identifying one or more pictures in DPB 92 of video decoder 30B, video decoder 30B may also output information indicating that a picture has been missed, and information identifying the missed picture. In response, video encoder 20A may inter-prediction encode a current picture based on pictures identified as being in DPB 92 of video decoder 30B or pictures that were previously determined as usable to inter-predict the identified pictures or pictures following the identified pictures in coding order.

Figure 6:
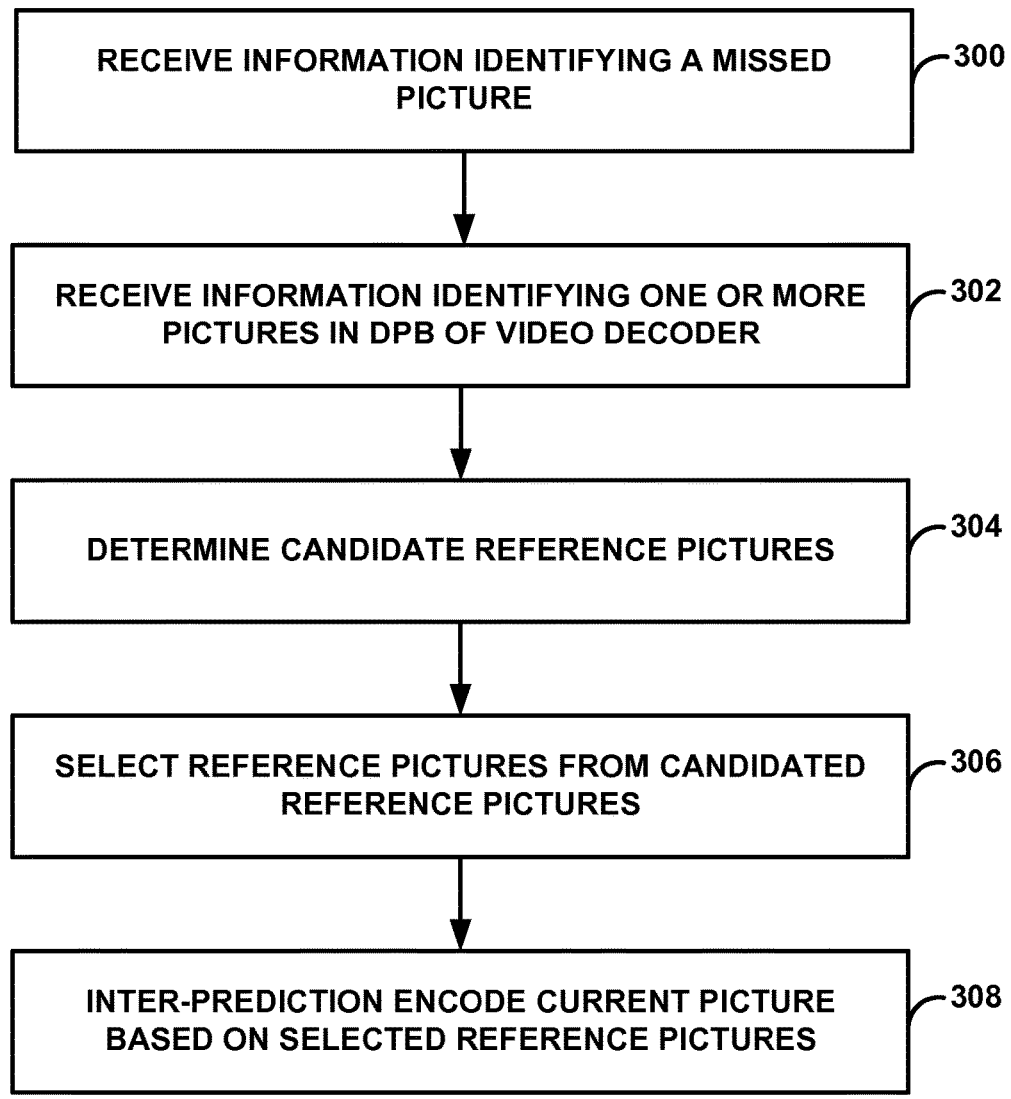
FIG. 6 is a flowchart illustrating another example method of encoding video data.

FIG. 6 is a flowchart illustrating another example method of encoding video data. As above, the example is described with respect to video encoder 20A. As illustrated in FIG. 6, video encoder 20A may receive information identifying a missed picture from video decoder 30B (300). Video encoder 20A may also receive information identifying one or more pictures that are currently stored in DPB 92 of video decoder 30B (302). In some examples, video encoder 20A may receive information identifying one or more pictures that are currently stored in DPB 92 of video decoder 30B only in instances where video decoder 30B determines that a picture was missed.

For instance, in some examples, video decoder 30B may output information identifying a correctly decoded picture to video encoder 20A after each instance of correctly decoding the picture, and video encoder 20A may then utilize one or more of these identified pictures to inter-prediction encode a current picture. In some examples, video decoder 30B may output information identifying one or more pictures stored in DPB 64 (e.g., one or more correctly decoded pictures) only when video decoder 30B determines that a picture was missed (e.g., a picture was not decoded, was not reconstructed accurately, or was not reconstructed fully). In these examples, video decoder 30B may also output information identifying the missed picture (e.g., POC value of the missed picture).

As illustrated in FIG. 6, receiving information identifying a missed picture and receiving information identifying one or more pictures in DPB 92 of video decoder 30B are illustrated separately. However, the techniques described in this disclosure are not so limited. In some examples, video encoder 20A may receive information identifying a missed picture and information identifying one or more pictures in DPB 92 of video decoder 30B in a bundled feedback message. As one example, a single feedback message may include information identifying the missed picture and information identifying one or more pictures currently stored in DPB 92 of video decoder 30B.

Video encoder 20A may determine candidate reference pictures (304). The candidate pictures may be limited to only the one or more pictures in DPB 92 of video decoder 30B that video decoder 30B identified in the feedback message. In some examples, the candidate pictures may be pictures, still stored in DPB 64 of video encoder 20A, that could have been used to inter-prediction encode the one or more pictures video decoder 30B identified.

Video encoder 20A may select reference picture from the candidate reference pictures to inter-prediction encode the current picture (306). Video encoder 20A may inter-prediction encode the current picture based on the selected reference pictures (308).

Figure 7:
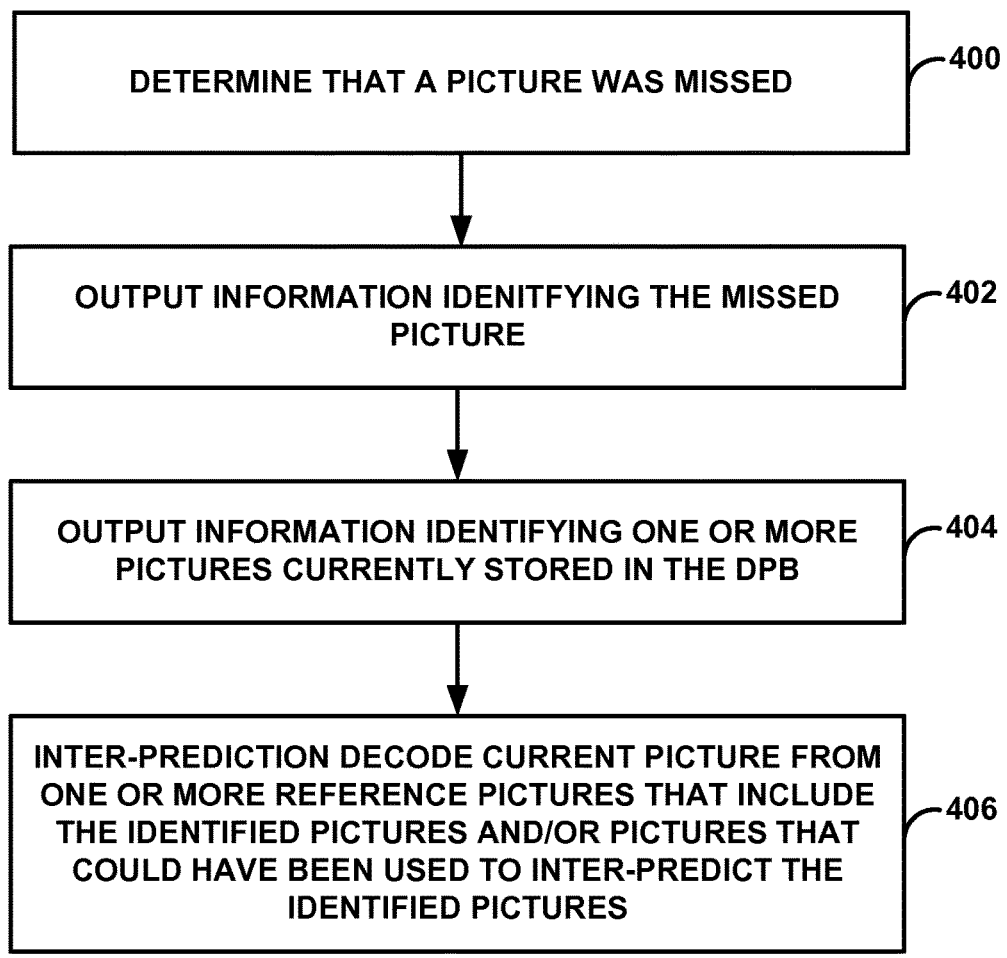
FIG. 7 is a flowchart illustrating another example method of decoding video data.

FIG. 7 is a flowchart illustrating another example method of decoding video data. As above, for ease, the description is with respect to video decoder 30B. As illustrated, video decoder 30B may determine that a picture was missed (400). For example, video decoder 30B may determine that a picture was missed when that picture is to be used to inter-predict another picture, and video decoder 30B determines that the picture is not available in DPB 92 of video decoder 30B. As another example, video decoder 30B may determine that a picture was missed when video decoder 30B is to output that picture, and the picture is not available in DPB 92 of video decoder 30B.

Video decoder 30B may output information identifying the missed picture to video encoder 20A (402). Video decoder 30B may also output information identifying one or more pictures currently stored in DPB 92 of video decoder 30B (404). For example, video decoder 30B may output picture order count (POC) values identifying the missed picture and the one or more pictures currently stored in DPB 92 of video decoder 30B. In some examples, video decoder 30B may output information identifying the missed picture and information identifying the one or more pictures currently stored in DPB 92 in a bundled feedback message. As one example, there may be only one message that video decoder 30B needs to send to identify the missed picture and the one or more pictures currently stored in DPB 92. In this manner, video decoder 30B may transmit an SPLI type message that identifies a missing picture and a RPSI type message that identifies one or more pictures currently stored in DPB 92 of video decoder 30B.

In some examples, video decoder 30B may output information identifying the missed picture and one or more pictures currently stored in DPB 92 in more than one message. In some examples, video decoder 30B may output information identifying each picture that it correctly decoded to video encoder 20A after decoding the picture. In some examples, video decoder 30B may output information identifying one or more pictures that are currently stored in DPB 92 only when video decoder 30B determines that a picture was missed.

Video decoder 30B may inter-prediction decode a current picture from one or more reference pictures (406). The reference pictures may include only the identified pictures. In some examples, the reference pictures may include the identified pictures and pictures that could have been used to inter-predict the identified pictures. In some examples, the reference pictures may only include pictures that could have been used to inter-predict the identified pictures.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:

storing information indicating pictures that could have been used to inter-prediction encode respective pictures and following pictures, wherein one or more of the respective pictures are stored in a decoded picture buffer (DPB);

receiving, from a device comprising a video decoder, information identifying a previously decoded picture that is stored in a DPB of the video decoder at the time the video decoder transmitted the information;

retrieving the stored information indicating the pictures that could have been used to inter-prediction encode the identified picture and following pictures;

determining one or more candidate reference pictures that are available for encoding a current picture based on the identified picture and the retrieved information, wherein the one or more candidate reference pictures include one or more pictures that were previously determined, during encoding of the identified picture, to be usable for inter-prediction encoding the identified picture or were previously determined, during encoding of pictures following the identified picture, to be usable for inter-prediction encoding the pictures following the identified picture in coding order, and that are still stored in a DPB of a video encoder based on the retrieved information;

selecting one or more reference pictures for the current picture from the determined one or more candidate reference pictures and the identified picture; and inter-prediction encoding the current picture based on the selected one or more reference pictures.

2. The method of claim 1, further comprising:
constructing, during the encoding of an available picture that is later identified by the video decoder and prior to the encoding of the current picture, one or more of:
- a first reference picture subset that includes any short-term reference pictures that precede the available picture in display order and that were determined to be usable to inter-predict the available picture and were determined to be usable to inter-predict the one or more pictures following the available picture in coding order;
- a second reference picture subset that includes any short-term reference pictures that follow the available picture in display order and that were determined to be usable to inter-predict the available picture and were determined to be usable to inter-predict the one or more pictures following the available picture in coding order;
- a third reference picture subset that includes any long-term reference pictures that were determined to be usable to inter-predict the available picture and were determined to be usable to inter-predict the one or more pictures following the available picture in coding order;
- a fourth reference picture subset that includes any short-term reference pictures that were determined to be usable to inter-predict the one or more pictures following the available picture in coding order, and were determined not to be usable to inter-predict the available picture; and
- a fifth reference picture subset that includes any long-term reference pictures that were determined to be usable to inter-predict the one or more pictures following the available picture in coding order, and were determined not to be usable to inter-predict the available picture, wherein pictures in one or more of the first, second, third, fourth, and fifth reference picture subsets comprises pictures that were previously determined to be usable for inter-prediction encoding the available picture or were previously determined to be usable for inter-prediction encoding pictures following the available picture in coding order, and wherein determining one or more candidate reference pictures comprises determining one or more candidate reference pictures from one or more of the first reference picture subset, the second reference picture subset, the third reference picture subset, the fourth reference picture subset, and the fifth reference picture subset.

3. The method of claim 2, wherein determining one or more candidate reference pictures comprises determining one or more candidate reference pictures from the first, second, and third reference picture subsets, and not from the fourth and fifth reference picture subsets.

4. The method of claim 2, wherein determining one or more candidate reference pictures comprises determining one or more candidate reference pictures from the first and second reference picture subsets, and not from the third, fourth, and fifth reference picture subsets.

5. The method of claim 1, further comprising:
- determining that the identified picture is not available for encoding the current picture based on the identified picture not being stored in the DPB of the video encoder based on the retrieved information; and
- intra-prediction encoding the current picture based on a determination that the identified picture is not available for encoding the current picture.

6. The method of claim 1, further comprising:
- receiving information identifying a missed picture; and
- excluding the missed picture from the determined one or more candidate reference pictures.

7. The method of claim 1, wherein inter-prediction encoding the current picture based on the selected one or more reference pictures comprises bi-prediction encoding the current picture based on two pictures from the selected reference pictures.

8. A device for encoding video data, the device comprising:
- a first decoded picture buffer (DPB) comprising a memory configured to store one or more pictures; and
- a video encoder comprising one or more processors, wherein the video encoder is configured to:
  - store information indicating pictures that could have been used to inter-prediction encode respective pictures and following pictures, wherein one or more of the respective pictures are stored in the first DPB;
  - receive, from a device comprising a video decoder, information identifying a previously decoded picture that is stored in a second DPB of the video decoder at the time the video decoder transmitted the information;
  - retrieve the stored information indicating the pictures that could have been used to inter-prediction encode the identified picture and following pictures;
  - determine one or more candidate reference pictures that are available for encoding a current picture based on the identified picture, wherein the one or more candidate reference pictures include one or more pictures that were previously determined, during encoding of the identified picture, to be usable for inter-prediction encoding the identified picture or were previously determined, during encoding of pictures following the identified picture, to be usable for inter-prediction encoding the pictures following the identified picture in coding order, and that are still stored in a DPB of a video encoder based on the retrieved information;
  - select one or more reference pictures for the current picture from the determined one or more candidate reference pictures and the identified picture; and
  - inter-prediction encode the current picture based on the selected one or more reference pictures.

9. The device of claim 8, wherein the video encoder is configured to:
construct, during the encoding of an available picture that is later identified by the video decoder and prior to the encoding of the current picture, one or more of:
- a first reference picture subset that includes any short-term reference pictures that precede the available picture in display order and that were determined to be usable to inter-predict the available picture and were determined to be usable to inter-predict the one or more pictures following the available picture in coding order;
- a second reference picture subset that includes any short-term reference pictures that follow the available picture in display order and that were determined to be usable to inter-predict the available picture and were determined to be usable to inter-predict the one or more pictures following the available picture in coding order;
- a third reference picture subset that includes any long-term reference pictures that were determined to be usable to inter-predict the available picture and were determined to be usable to inter-predict the one or more pictures following the available picture in coding order;

a fourth reference picture subset that includes any short-term reference pictures that were determined to be usable to inter-predict the one or more pictures following the available picture in coding order, and were determined not to be usable to inter-predict the available picture; and a fifth reference picture subset that includes any long-term reference pictures that were determined to be usable to inter-predict the one or more pictures following the available picture in coding order, and were determined not to be usable to inter-predict the available picture, wherein pictures in one or more of the first, second, third, fourth, and fifth reference picture subsets comprises pictures that were previously determined to be usable for inter-prediction encoding the available picture or were previously determined to be usable for inter-prediction encoding pictures following the available picture in coding order, and wherein, to determine one or more candidate reference pictures, the video encoder is configured to determine one or more candidate reference pictures from one or more of the first reference picture subset, the second reference picture subset, the third reference picture subset, the fourth reference picture subset, and the fifth reference picture subset.

10. The device of claim 9, wherein, to determine one or more candidate reference pictures, the video encoder is configured to determine one or more candidate reference pictures from the first, second, and third reference picture subsets, and not from the fourth and fifth reference picture subsets.

11. The device of claim 9, wherein, to determine one or more candidate reference pictures, the video encoder is configured to determine one or more candidate reference pictures from the first and second reference picture subsets, and not from the third, fourth, and fifth reference picture subsets.

12. The device of claim 8, wherein the video encoder is configured to:

determine that the identified picture is not available for encoding the current picture based on the retrieved information; and intra-prediction encode the current picture based on a determination that the identified picture is not available for encoding the current picture.

13. The device of claim 8, wherein the video encoder is configured to:

receive information identifying a missed picture; and exclude the missed picture from the determined one or more candidate reference pictures.

14. The device of claim 8, wherein to inter-prediction encode the current picture based on the selected one or more reference pictures, the video encoder is configured to bi-prediction encode the current picture based on two pictures from the selected reference pictures.

* * * * *